United States Patent
Li et al.

(10) Patent No.: US 12,271,534 B2
(45) Date of Patent: Apr. 8, 2025

(54) METHOD FOR DISPLAYING ASSOCIATED TERM, TERMINAL DEVICE, AND COMPUTER STORAGE MEDIUM

(71) Applicant: Petal Cloud Technology Co., Ltd., Dongguan (CN)

(72) Inventors: Furong Li, Shenzhen (CN); Fangshan Wang, Shenzhen (CN)

(73) Assignee: PETAL CLOUD TECHNOLOGY CO., LTD., Dongguan (CN)

( * ) Notice: Subject to any disclaimer, the term of this patent is extended or adjusted under 35 U.S.C. 154(b) by 0 days.

(21) Appl. No.: 18/547,227

(22) PCT Filed: Feb. 9, 2022

(86) PCT No.: PCT/CN2022/075668
§ 371 (c)(1),
(2) Date: Aug. 21, 2023

(87) PCT Pub. No.: WO2022/174749
PCT Pub. Date: Aug. 25, 2022

(65) Prior Publication Data
US 2024/0134467 A1   Apr. 25, 2024

(30) Foreign Application Priority Data
Feb. 20, 2021   (CN) .................. 202110193102.X

(51) Int. Cl.
*G06F 3/023*      (2006.01)
*G06F 3/04817*    (2022.01)
(Continued)

(52) U.S. Cl.
CPC .......... *G06F 3/0237* (2013.01); *G06F 3/0236* (2013.01); *G06F 3/04817* (2013.01);
(Continued)

(58) Field of Classification Search
CPC .. G06F 3/0237; G06F 3/04817; G06F 3/0482; G06F 16/9532; G06F 16/248; G06F 3/04842; G06F 3/0236; G06Q 30/0631
(Continued)

(56) References Cited

U.S. PATENT DOCUMENTS 9,589,032 B1 * 3/2017 Brinck .............. G06F 16/90324
11,256,407 B2 * 2/2022 Park ................... G06F 3/04883
(Continued)

FOREIGN PATENT DOCUMENTS

CN   104216918 A   12/2014
CN   107273457 A   10/2017
(Continued)

*Primary Examiner* — Tom V Sheng
(74) *Attorney, Agent, or Firm* — Conley Rose, P.C.

(57) ABSTRACT

A method for displaying an associated term includes obtaining a search term entered in a search bar; determining an associated term corresponding to the search term; determining an application corresponding to the associated term; and displaying the associated term and an identifier corresponding to the associated term, where the identifier is used to open the application corresponding to the associated term corresponding to the identifier. The method for displaying the associated term may facilitate interaction between a user and another application on the terminal device when the user performs searching in a search engine of the terminal device.

20 Claims, 25 Drawing Sheets

(51) Int. Cl.
  *G06F 3/0482* (2013.01)
  *G06F 3/04842* (2022.01)
  *G06F 16/9532* (2019.01)
  *G06Q 30/0601* (2023.01)
  *G06F 16/248* (2019.01)

(52) U.S. Cl.
  CPC ........ *G06F 3/0482* (2013.01); *G06F 3/04842* (2013.01); *G06F 16/9532* (2019.01); *G06Q 30/0631* (2013.01); *G06F 16/248* (2019.01)

(58) Field of Classification Search
  USPC .......................................................... 345/156
  See application file for complete search history.

(56) References Cited

U.S. PATENT DOCUMENTS

| | | | | |
|---|---|---|---|---|
| 11,636,155 | B2* | 4/2023 | Xie | G06F 16/90335 |
| | | | | 707/706 |
| 2005/0234972 | A1* | 10/2005 | Zeng | G06F 16/9532 |
| 2008/0033921 | A1* | 2/2008 | Arrouye | G06F 16/2453 |
| 2013/0063373 | A1* | 3/2013 | Roh | G06F 3/04886 |
| | | | | 345/173 |
| 2015/0006503 | A1* | 1/2015 | Cary | G06F 16/9532 |
| | | | | 707/710 |
| 2015/0019546 | A1 | 1/2015 | Dou | |
| 2015/0039582 | A1* | 2/2015 | Liutikas | G06F 16/957 |
| | | | | 707/706 |
| 2015/0379137 | A1* | 12/2015 | Cheng | G06F 16/9537 |
| | | | | 705/26.62 |
| 2017/0147659 | A1 | 5/2017 | Fan et al. | |
| 2018/0197223 | A1* | 7/2018 | Grossman | G06F 3/0482 |
| 2018/0348967 | A1* | 12/2018 | Kondrk | G06F 3/0482 |
| 2019/0114668 | A1* | 4/2019 | Zhuo | G06F 16/00 |
| 2020/0192923 | A1* | 6/2020 | Luo | G06F 16/3334 |
| 2020/0192942 | A1* | 6/2020 | Luo | G06F 16/3349 |
| 2020/0265094 | A1* | 8/2020 | Liu | G06F 40/247 |
| 2020/0311068 | A1* | 10/2020 | Hornkvist | G06F 16/248 |
| 2022/0222304 | A1* | 7/2022 | Chung | G06F 16/90324 |
| 2022/0358089 | A1 | 11/2022 | Liu et al. | |
| 2023/0205827 | A1* | 6/2023 | Que | G06F 16/2423 |
| | | | | 707/706 |

FOREIGN PATENT DOCUMENTS

| | | |
|---|---|---|
| CN | 107577804 A | 1/2018 |
| CN | 108897785 A | 11/2018 |
| CN | 110770716 A | 2/2020 |
| CN | 112199561 A | 1/2021 |
| CN | 113190741 A | 7/2021 |
| CN | 110799974 B | 4/2024 |
| WO | 2017059388 A1 | 4/2017 |
| WO | 2019041285 A1 | 3/2019 |
| WO | 2020259554 A1 | 12/2020 |

* cited by examiner

| Domain | Application name | Application icon | Link for opening an application |
|---|---|---|---|
| Video | iQIYI |  | Link 1 |
| | Tencent Video |  | Link 2 |
| | ... | ... | ... |
| Music | KuGou |  | Link 3 |
| | QQ Music |  | Link 4 |
| | ... | ... | ... |
FIG. 12

| Associated term (domain object) | Domain | Popularity value of an object in a domain thereof | Application name | Application icon | Link for opening an application |
|---|---|---|---|---|---|
| Zhidao Yige Difang Women Cengjing Laiguo | Video | 89 | iQIYI |  | Link 1 |
| | | | Tencent Video |  | Link 2 |
| | | | ... | ... | ... |
| Zhidao Yige Difang Women Cengjing Laiguo | Ebook | 25 | WeChat Read |  | Link 3 |
| | | | ... | ... | ... |

FIG. 13

| Associated term (domain object) | Domain | Popularity value of an object in a domain thereof | Application name | Application icon | Link for opening an application |
|---|---|---|---|---|---|
| Zhidao Yige Difang Women Cengjing Laiguo | Video | 89 | Tencent Video |  | Link 1 |
| | | | iQIYI |  | Link 2 |

FIG. 14

| Associated term (domain object) | Domain | Popularity value of an object in a domain thereof | Application name | Application icon | Link for opening an application |
|---|---|---|---|---|---|
| Zhihu | Application market | 75 | Tencent App Store |  | Link 1 |
| Zhidao Yige Difang Women Cengjing Laiguo | Video | 89 | Tencent Video |  | Link 2 |
| | | | iQIYI |  | Link 3 |
FIG. 15

METHOD FOR DISPLAYING ASSOCIATED TERM, TERMINAL DEVICE, AND COMPUTER STORAGE MEDIUM

This is a National Stage of International Patent Application No. PCT/CN2022/075668 filed on Feb. 9, 2022, which claims priority to Chinese Patent Application No. 202110193102.X filed on Feb. 20, 2021. Both of the aforementioned applications are hereby incorporated by reference in their entireties.

TECHNICAL FIELD

This application relates to the field of terminal technologies, and in particular, to a method for displaying an associated term, a terminal device, and a computer storage medium.

BACKGROUND

With the rapid development of internet technologies and gradual popularization of terminal devices, an increasing quantity of users use terminal devices such as mobile phones and tablets to access the Internet and use search engines of browsers in the terminal devices to perform searching. When a user enters a search term in a search bar of a search engine, some associated terms are displayed in text below the search bar based on the search term entered by the user. The user may tap an associated term to go to a search page of the associated term and view a search result.

However, in a current method for displaying an associated term, the associated term is presented only in text, and interaction with another application is not supported. Consequently, search experience of the user is limited.

SUMMARY

In view of this, embodiments of this application provide a method for displaying an associated term, a terminal device, and a computer storage medium. When the terminal device invokes a search engine to perform a search, an interface for opening another application can be provided, which enriches interaction between a user and the another application when the user performs searching.

According to a first aspect, this application provides a method for displaying an associated term, including: obtaining a search term entered in a search bar; determining an associated term corresponding to the search term; determining an application corresponding to the associated term; and displaying the associated term and an identifier corresponding to the associated term, where the identifier is used to open the application corresponding to the associated term.

In a possible implementation of the first aspect, a domain corresponding to the associated term is determined based on a correspondence between a domain and an object in the domain; and the application corresponding to the associated term is determined based on a correspondence between the domain and an application.

In a possible implementation of the first aspect, the identifier corresponding to the associated term includes an application icon of the application corresponding to the associated term. The user may directly tap the identifier to open or go to a corresponding application interface, which is simple and quick.

In a possible implementation of the first aspect, the identifier corresponding to the associated term includes a domain identifier corresponding to the associated term, the domain identifier is used to open a first menu, and the first menu is used to display an application icon of the application corresponding to the associated term. The user taps the identifier to open a menu that includes an application icon related to the domain corresponding to the associated term. The menu displays different applications in a same domain for the user to select, which meets diversified requirements of the user.

In a possible implementation of the first aspect, the application corresponding to the associated term includes only an application installed on a terminal device, and the application icon is used to directly open the application.

In a possible implementation of the first aspect, the application corresponding to the associated term includes an application installed on a terminal device and an application not installed on the terminal device, and when the application is not installed on the terminal device, the application icon is used to download the application. The user may click the application icon to download the application. This provides a quick download service for the user.

In a possible implementation of the first aspect, when the application is installed on the terminal device, the application icon is used to directly open the application.

In a possible implementation of the first aspect, the correspondence between a domain and an object in the domain further includes a popularity value in the domain.

In a possible implementation of the first aspect, a domain object index is created, where the domain object index stores the correspondence between a domain and an object in the domain.

In a possible implementation of the first aspect, the associated term is matched with an object in a domain, and the domain corresponding to the associated term is determined, where there are one or more domains.

In a possible implementation of the first aspect, the correspondence between the domain and an application includes an application icon and a link associated with the application.

In a possible implementation of the first aspect, an application list corresponding to the domain is established, where the list stores the correspondence between the domain and an application.

In a possible implementation of the first aspect, the application corresponding to the associated term is determined based on the domain corresponding to the associated term and a relationship between the domain and an application. In this manner, a relationship is established between the associated term and a domain. In addition, a correspondence between the domain and an application is used to establish a correspondence between the associated term and the application. In this way, the associated term is associated with the application.

In a possible implementation of the first aspect, before the step of displaying the associated term and an identifier corresponding to the associated term, the method further includes: sorting a plurality of associated terms and identifiers corresponding to the associated terms.

In a possible implementation of the first aspect, the sorting a plurality of associated terms and identifiers corresponding to the associated terms includes: performing sorting based on text lengths of the associated terms. The sorted associated terms are displayed in a tidier manner. This is more user-friendly to view the associated terms.

In a possible implementation of the first aspect, the sorting a plurality of associated terms and identifiers corresponding to the associated terms includes: performing sorting based on a user preference value for a domain corresponding to the associated term and/or a popularity value in the domain. The sorted associated terms better meet preference of the user. This provides a personalized service for the user.

In a possible implementation of the first aspect, the search term corresponds to a preset quantity of associated terms. A quantity of associated terms is preset to limit the quantity of associated terms. This facilitates subsequent display of the associated terms.

In a possible implementation of the first aspect, the method for determining an associated term corresponding to the search term includes: matching, based on a user search record, an associated term including the search term. A search record is a record of a search performed by a terminal user. Therefore, the matched associated term better satisfies a search intention of the user.

In a possible implementation of the first aspect, the method for determining an associated term corresponding to the search term includes: determining, based on an association result returned by a server, the associated term corresponding to the search term. For search terms unfamiliar to the user, association results, from the server, of the search terms may be used to provide popular associated terms for the user.

In a possible implementation of the first aspect, when the associated term does not have a corresponding application, the associated term is used to open a normal search display interface.

According to a second aspect, this application provides a terminal device, including: an obtaining module, configured to obtain a search term entered in a search bar; a determining module, configured to determine an associated term corresponding to the search term, where the determining module is further configured to determine an application corresponding to the associated term; and a displaying module, configured to display the associated term and a domain identifier corresponding to the associated term, where the domain identifier is used to open the application corresponding to the associated term.

The determining module includes an associated term generating module, a domain determining module, an application querying module, and a correspondence constructing module.

In a possible implementation of the second aspect, the associated term generating module is configured to extend a preset quantity of associated terms. A quantity of associated terms is preset to limit the quantity of associated terms. This facilitates subsequent display of the associated terms.

In a possible implementation of the second aspect, the associated term generating module is configured to match, based on a user search record, an associated term including the search term. A search record is a record of a search performed by a terminal user. Therefore, the matched associated term better satisfies a search intention of the user.

In a possible implementation of the second aspect, the associated term generating module is configured to determine, based on an association result returned by a server, the associated term corresponding to the search term. For search terms unfamiliar to the user, association results, from the server, of the search terms may be used to provide popular associated terms for the user.

In a possible implementation of the second aspect, the domain determining module is configured to determine a domain corresponding to the associated term based on a correspondence between a domain and an object in the domain.

In a possible implementation of the second aspect, the application querying module is configured to determine the application corresponding to the associated term based on a correspondence between the domain and an application.

In a possible implementation of the second aspect, the correspondence constructing module is configured to establish the correspondence between a domain and an object in the domain, where the correspondence includes a name of the domain, a name of the object, and a popularity value of the object in the domain.

In a possible implementation of the second aspect, the correspondence constructing module is configured to create a domain object index, where the domain object index stores the correspondence between a domain and an object in the domain.

In a possible implementation of the second aspect, the correspondence constructing module is further configured to establish the correspondence between the domain and an application, where the information includes a name of the application, an application icon, and a link associated with the application.

In a possible implementation of the second aspect, the correspondence constructing module is configured to establish an application list corresponding to the domain, where the list stores the correspondence between the domain and an application.

In a possible implementation of the second aspect, the determining module is further configured to determine, based on the domain corresponding to the associated term and a relationship between the domain and an application, the application corresponding to the associated term. In this manner, a relationship is established between the associated term and a domain. In addition, a correspondence between the domain and an application is used to establish a correspondence between the associated term and the application. In this way, the associated term is associated with the application.

In a possible implementation of the second aspect, the displaying module is further configured to sort a plurality of associated terms and identifiers corresponding to the associated terms.

In a possible implementation of the second aspect, the displaying module is further configured to sort the associated terms based on text lengths of the associated terms. The sorted associated terms are displayed in a tidier manner. This is more user-friendly to view the associated terms.

In a possible implementation of the second aspect, the displaying module is further configured to perform sorting based on a user preference value for a domain corresponding to the associated term and a popularity value in the domain. The sorted associated terms better meet preference of the user. This provides a personalized service for the user.

In a possible implementation of the second aspect, the displaying module is further configured to display an application icon of the application corresponding to the associated term. The user directly taps the identifier to open or go to a corresponding application interface, which is simple and quick.

In a possible implementation of the second aspect, the displaying module is further configured to display the domain identifier corresponding to the associated term. The domain identifier is used to open a first menu, and the first menu is used to display the application icon of the application corresponding to the associated term. The user taps the identifier to open a menu that includes an application icon related to the domain corresponding to the associated term. The menu displays different applications in a same domain for the user to select, which meets diversified requirements of the user.

According to a third aspect, this application provides a terminal device, including a memory, a processor, and a computer program that is stored in the memory and that can run on the processor. When the processor executes the computer program, the method that is for displaying an associated term and that is described in the first aspect of this application is performed.

According to a fourth aspect, this application provides a computer-readable storage medium, where the computer-readable storage medium is configured to store a computer program used for electronic data exchange, and the computer program enables a computer to perform the method that is for displaying an associated term and that is described in the first aspect of this application.

According to a fifth aspect, this application provides a computer program product, where the computer program product includes a non-transitory computer-readable storage medium storing a computer program, and the computer program is operable to enable a computer to perform the method that is for displaying an associated term and that is described in the first aspect of this application.

In this application, when a user uses a search engine of the terminal device to perform a search, an associated term matching an entered search term and a domain identifier corresponding to the associated term may be displayed. The user taps the domain identifier to open an application menu in which the user may perform selection and that corresponds to the domain identifier. The user selects and taps a corresponding application to go to an interface of the corresponding application. This centralizes scattered scenarios such as an application download, a weather query, video playback, and music playback into a display scenario of associated terms, and provides the user with richer, diversified, and one-stop experience.

BRIEF DESCRIPTION OF DRAWINGS

To describe the technical solutions in embodiments of this application more clearly, the following briefly describes the accompanying drawings for describing the embodiments.

FIG. 12 illustrates a table showing example application lists corresponding to domains in correspondences;

FIG. 13 illustrates a table showing an associated term-application correspondence list;

FIG. 14 illustrates a table showing an associated term-application correspondence list; and FIG. 15 illustrates a table showing a complete associated term-application correspondence list.

DESCRIPTION OF EMBODIMENTS

Figure 1:
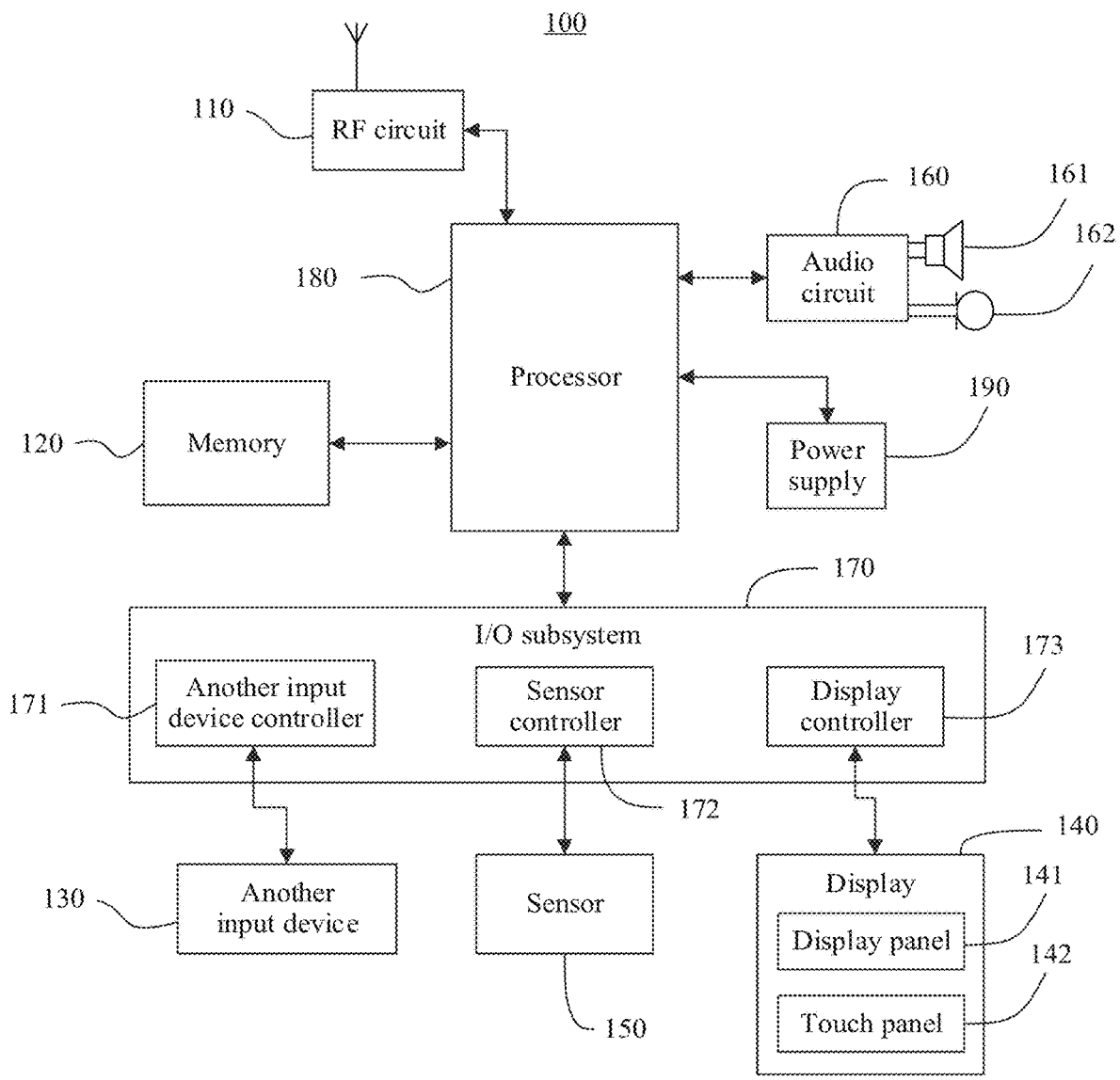
FIG. 1 is a schematic diagram of a structure of a terminal device according to an embodiment of this application.

To make a person skilled in the art understand the solutions in this application better, the following clearly and completely describes the technical solutions in embodiments of this application with reference to the accompanying drawings in embodiments of this application. It is clear that the described embodiments are merely some but not all of embodiments of this application. All other embodiments obtained by a person of ordinary skill in the art based on embodiments of this application without creative efforts shall fall within the protection scope of this application.

It should be understood that, when used in this specification and the appended claims of this application, the term "include" indicates presence of the described features, entireties, steps, operations, elements, and/or components, but does not exclude presence or addition of one or more other features, entireties, steps, operations, elements, components, and/or sets thereof.

It should also be understood that the term "and/or" used in this specification and the appended claims of this application refers to any combination and all possible combinations of one or more associated listed items, and includes these combinations.

An "embodiment" mentioned in this specification means that a particular characteristic, structure, or feature described with reference to embodiments may be included in at least one embodiment of this application. The phrase shown in various locations in this specification may not necessarily refer to a same embodiment, and is not an independent or optional embodiment exclusive from another embodiment. It is explicitly and implicitly understood by a person skilled in the art that embodiments described in this specification may be combined with another embodiment.

Reference to "an embodiment", "some embodiments", or the like described in this specification of this application indicates that one or more embodiments of this application include a specific feature, structure, or characteristic described with reference to the embodiments. Therefore, statements such as "in an embodiment", "in some embodiments", "in some other embodiments", and "in other embodiments" that appear at different places in this specification do not necessarily refer to a same embodiment. Instead, the statements mean "one or more but not all of embodiments", unless otherwise specifically emphasized in another manner. The terms "include", "comprise", and "have", and variants thereof all mean "include but are not limited to", unless otherwise specifically emphasized in another manner.

A terminal device in embodiments of this application may be a handheld device, a vehicle-mounted device, a wearable device, or a computing device that has a wireless communication function, another processing device connected to a wireless modem, user equipment (User Equipment, UE) in various forms, a mobile station (Mobile Station, MS), or the like. For ease of description, the devices mentioned above are collectively referred to as the terminal device. A specific type of the terminal device is not limited in embodiments of this application.

For example, the terminal device is a mobile phone. FIG. 1 is a block diagram of a structure of a part of a mobile phone according to an embodiment of this application. Refer to FIG. 1, the mobile phone includes components such as a radio frequency (Radio Frequency, RF) circuit 110, a memory 120, another input device 130, a display 140, a sensor 150, an audio circuit 160, an I/O subsystem 170, a processor 180, and a power supply 190. A person skilled in the art may understand that the structure of the mobile phone shown in FIG. 1 does not constitute a limitation on the mobile phone. The mobile phone may include more or fewer components than those shown in the figure, or may include a combination of some components, or may have different component arrangements.

The following describes each component of the mobile phone 100 in detail with reference to FIG. 1.

The RF circuit 110 may be configured to receive and send signals during information receiving and sending or during a call. In particular, after receiving downlink information from a base station, the RF circuit sends the downlink information to the processor 180 for processing, and further sends related uplink data to the base station. Generally, the RF circuit includes, but is not limited to, an antenna, at least one amplifier, a transceiver, a coupler, an LNA (Low Noise Amplifier, low noise amplifier), or a duplexer. In addition, the RF circuit 110 may further communicate with a network and another device through wireless communication. The wireless communication may be implemented by using any communication standard or protocol, including but not limited to GSM (Global System for Mobile communication, global system for mobile communication), GPRS (General Packet Radio Service, general packet radio service), CDMA (Code Division Multiple Access, code division multiple access), WCDMA (Wideband Code Division Multiple Access, wideband code division multiple access), LTE (Long Term Evolution, long term evolution), an email, or an SMS (Short Messaging Service, short messaging service).

The memory 120 may be configured to store a software program and a module. The processor 180 performs various function applications of the mobile phone 100 and data processing by running the software program and the module that are stored in the memory 120. The memory 120 may mainly include a program storage area and a data storage area. The program storage area may store an operating system, an application required by at least one function (such as a sound play function and an image play function), and the like. The data storage area may store data (such as audio data and a phone book) created when the mobile phone 100 is used, and the like. In addition, the memory 120 may include a high-speed random access memory, or may include a nonvolatile memory such as at least one magnetic disk storage device, a flash memory, or another volatile solid-state storage device.

The another input device 130 may be configured to: receive entered digital or character information; and generate button signal input related to user settings and function control of the mobile phone 100. Specifically, the another input device 130 may include but is not limited to one or more of a physical keyboard, a function button (for example, a volume control button or an on/off button), a trackball, a mouse, a joystick, and an optical mouse (the optical mouse is a touch-sensitive surface that does not display a visual output, or is an extension of a touch-sensitive surface that includes a touchscreen). The another input device 130 is connected to another input device controller 171 of the I/O subsystem 170, and exchanges a signal with the processor 180 under control of the another input device controller 171. For example, a user enters a keyword in a search bar to perform a search.

The display 140 may be configured to display information entered by the user or information provided for the user, and various menus of the mobile phone 100; and may further receive a user input. Specifically, the display 140 may include a display panel 141 and a touch panel 142. The display panel 141 may be configured in a form of an LCD (Liquid Crystal Display, liquid crystal display), an OLED (Organic Light-Emitting Diode, organic light-emitting diode), or the like. The touch panel 142 is also referred to as a touchscreen, a touch-sensitive screen, or the like. The touch panel 142 may collect a contact or non-contact operation of the user on or near the touch panel 142 (such as an operation performed by the user on or near the touch panel 142 by using any appropriate object or accessory such as a finger or a stylus, or a motion sensing operation, where the operation includes a single-point control operation, a multi-point control operation, or another type of operation), and drive a corresponding connection apparatus based on a preset program. Optionally, the touch panel 142 may include two parts: a touch detection apparatus and a touch controller. The touch detection apparatus detects a touch orientation and gesture of the user, detects a signal generated by a touch operation, and transmits the signal to the touch controller. The touch controller receives touch information from the touch detection apparatus, converts the touch information into information that can be processed by the processor, and then sends the information to the processor 180. In addition, the touch controller can receive and execute a command sent by the processor 180. Moreover, the touch panel 142 may be implemented in a plurality of types such as a resistive type, a capacitive type, an infrared ray, and a surface acoustic wave. Alternatively, the touch panel 142 may be implemented by using any technology developed in the future. Further, the touch panel 142 may cover the display panel 141. The user may perform, based on content displayed on the display panel 141 (the displayed content includes but is not limited to a soft keyboard, a virtual mouse, a virtual button, and an icon), an operation on or near the touch panel 142 that covers the display panel 141. After detecting the operation on or near the touch panel 142, the touch panel 142 transmits the operation to the processor 180 through the I/O subsystem 170, to determine user input. Then, the processor 180 provides corresponding visual output on the display panel 141 through the I/O subsystem 170 based on the user input. In FIG. 7A to FIG. 7J, the touch panel 142 and the display panel 141 serve as two independent components to implement input and output functions of the mobile phone 100. However, in some embodiments, the touch panel 142 and the display panel 141 may be integrated to implement the input and output functions of the mobile phone 100. The display 140 may display an interface on which the user enters a search term, an interface for displaying an associated term, and a corresponding application interface that is obtained through redirection.

The mobile phone 100 may further include at least one type of sensor 150, such as an optical sensor, a motion sensor, and another sensor. Specifically, the optical sensor may include an ambient light sensor and a proximity sensor. The ambient light sensor may adjust brightness of the display panel 141 based on intensity of ambient light. The proximity sensor may turn off the display panel 141 and/or backlight when the mobile phone 100 moves to an ear. Other sensors such as a gyroscope, a barometer, a hygrometer, a thermometer, and an infrared sensor may be further configured for the mobile phone 100. Details are not described herein.

The audio circuit 160, a speaker 161, and a microphone 162 may provide an audio interface between the user and the mobile phone 100. The audio circuit 160 may transmit, to the speaker 161, a signal converted from received audio data, and the speaker 161 converts the signal into a sound signal and outputs the sound signal. In addition, the microphone 162 converts a collected sound signal into a signal; and the audio circuit 160 receives the signal, converts the signal into audio data, and outputs the audio data to the RF circuit 110 to send the audio data to, for example, another mobile phone, or outputs the audio data to the memory 120 for further processing.

The I/O subsystem 170 is configured to control an external input/output device, and may include the another input device controller 171, a sensor controller 172, and a display controller 173. Optionally, one or more other input control device controllers 171 receive a signal from the another input device 130 and/or send a signal to the another input device 130. The another input device 130 may include a physical button (a push button, a rocker button, or the like), a dial, a slider switch, a joystick, a click scroll wheel, or an optical mouse (the optical mouse is a touch-sensitive surface that does not display a visual output, or is an extension of a touch-sensitive surface formed by a touchscreen). It should be noted that the another input device controller 171 may be connected to any one or more of the foregoing devices. The display controller 173 in the I/O subsystem 170 receives a signal from the display 140 and/or sends a signal to the display 140. After the display 140 detects a user input, the display controller 173 converts the detected user input into interaction with a user interface object displayed on the display 140, to implement human-machine interaction. The sensor controller 172 may receive a signal from one or more sensors 150 and/or send a signal to one or more sensors 150.

The processor 180 is a control center of the mobile phone 100 and is connected to all parts of the entire mobile phone through various interfaces and lines, and performs various functions of the mobile phone 100 and data processing by running or executing the software program and/or the module stored in the memory 120 and invoking data stored in the memory 120, to perform overall monitoring on the mobile phone. Optionally, the processor 180 may include one or more processing units. Preferably, an application processor and a modem processor may be integrated into the processor 180. The application processor mainly processes an operating system, a user interface, an application, and the like; and the modem processor mainly processes wireless communication. It may be understood that the modem processor may not be integrated into the processor 180.

The mobile phone 100 further includes the power supply 190 (such as a battery) that supplies power to each component. Preferably, the power supply may be logically connected to the processor 180 through a power management system, to implement functions such as charging management, discharging management, and power consumption management by using the power management system.

Although not shown, the mobile phone 100 may further include a camera, a Bluetooth module, and the like. Details are not described herein.

Figure 2:
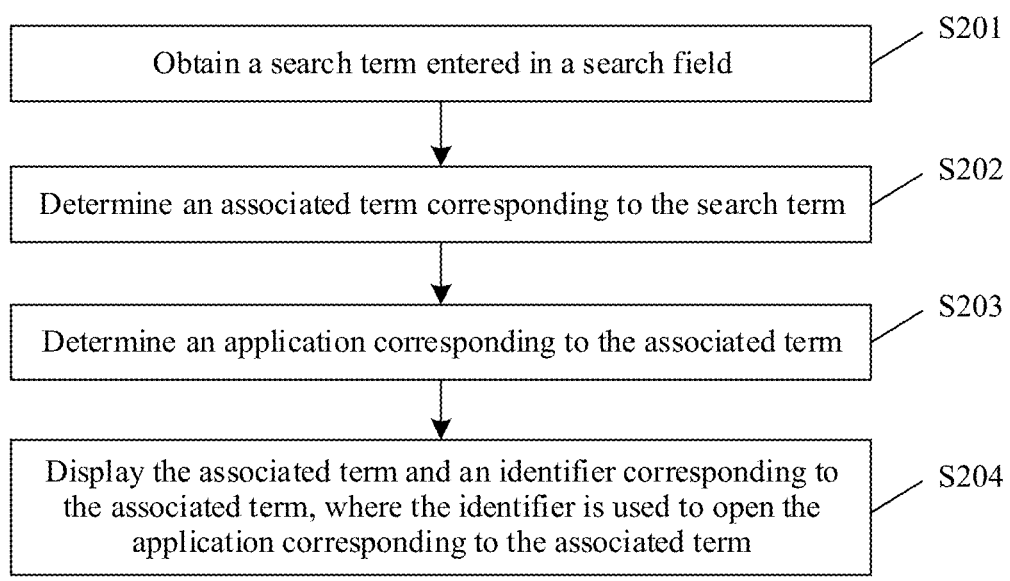
FIG. 2 is a schematic flowchart of a method for displaying an associated term according to an embodiment of this application.

With reference to FIG. 2, the following describes a procedure of a method, provided in an embodiment of this application, for displaying an associated term.

S201: Obtain a search term entered in a search bar.

In this embodiment of this application, a user may open a browser and another client application installed on a terminal device, to search for information by using a search engine. Specifically, for example, the terminal device is a mobile phone. The user opens a browser on the mobile phone, and enters a search term in a search bar (the search term may be entered by using a text input method, or through voice recording and recognition). The search term can be in Chinese, English, French, Japanese, or another language that can be recognized by the mobile phone. The search term may be a letter or a word, for example, "Zhi" or "we". The search term may be a combination of words in different languages, for example, "P 图".

Figure 3:
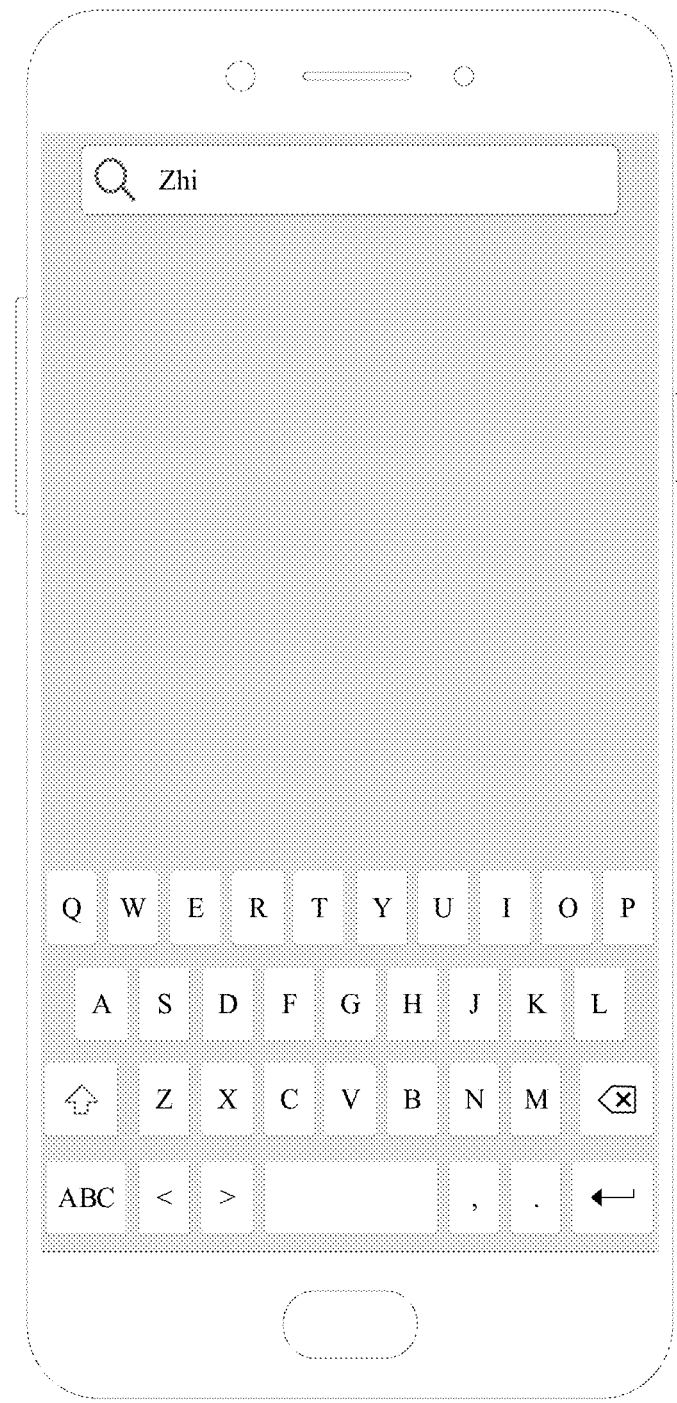
FIG. 3 is a schematic diagram of an interface for entering a search term in a search bar according to an embodiment of this application.

For example, in this embodiment, as shown in FIG. 3, the user opens the browser installed on the terminal device, and enters a search term "Zhi" in the search bar.

S202: Determine an associated term corresponding to the search term.

Specifically, the associated term corresponding to the search term is a term obtained by extending the search term. In this embodiment of this application, the associated term is not limited to a term. As an extension of the search term, the associated term may be an extended word of the search term, an extended phrase of the search term, an extended sentence of the search term, or a combination of an extended word, a letter, and a digit. For example, the search term entered by the user is "pencil", and the determined associated term corresponding to the search term "pencil" may be "large-long lead", "pencil and eraser", "pencil use method", or "pencil 001".

The extension of the search term may be a backward extension performed based on the search term, a forward extension performed based on the search term, or a bidirectional extension performed based on the search term. For example, the search term entered by the user is still "pencil". An associated term obtained through extension may be "pencil lead" (the backward extension), "automatic pencil" (the forward extension), or "automatic pencil use method" (the forward-backward bidirectional extension). An extension form of the search term is not specifically limited in this embodiment of this application.

Specifically, when the search term is in English, the associated term corresponding to the search term may be a word including the search term field, an English phrase including a word that includes the search term field, or an English sentence including a word that includes the search term field. For example, the search term entered by the user is "we". The determined associated term corresponding to the search term "we" may be "wechat", "wechat china", or "we are young".

Specifically, the associated term of the search term may be the search term itself. If the obtained search term is a semantically sound term that has an independent meaning when the term exists alone, the obtained search term may be used as the associated term corresponding to the search term. For example, when the search term entered by the user is a complete term with an independent meaning, such as "WeChat" or "Tencent Video", the search term may be used as an associated term of the search term.

For example, in this embodiment, if the search term obtained from the search bar is "Zhi", the determined associated term may be "Zhihu", "Zhishi Chanquan", "Zhishi Chanquan Fazhan Zhuangkuang", or "Zhidao Yige Difang Women Cengjing Laiguo".

In some embodiments, a default quantity of associated terms is set to determine a quantity of extended associated terms. For example, when the default quantity of associated terms is set to 8, eight associated terms are determined in this step for performing subsequent steps. The preset quantity of associated terms can be changed by the user. If the quantity of extended associated terms is less than the default quantity of associated terms, the determined quantity of associated terms depends on an actual quantity of extended associated terms.

In some embodiments, the associated term corresponding to the search term may be determined by matching, based on a user search record stored by the terminal device, an associated term that includes the search term. A comparison is made to determine whether a search term in a historical search record of the user includes the search term that is entered in the search bar and that is obtained in Step S201. If the search term in the historical search record of the user includes the foregoing search term, the search term in the historical search record of the user is determined as an associated term of the search term. The user search record may be obtained from a search log of a search engine application, or a search log of another type of application such as a music application or a video application.

In some embodiments, the associated term corresponding to the search term may alternatively be determined based on an association result returned by a server to the terminal. The terminal initiates, to the server, an association request for the search term that is entered in the search bar and that is obtained in Step S201. The server performs an extended search based on the search term, and returns an extended associated term that is obtained by performing the extended search based on the search term, to determine the associated term corresponding to the search term.

It should be noted that a method for determining the associated term corresponding to the search term is not limited to the foregoing two methods.

S203: Determine an application corresponding to the associated term.

The application corresponding to the associated term is an application related to the associated term, or an application that establishes a relationship with the associated term through a classification relationship. For example, if the associated term is "WeChat", an application related to "WeChat" may be the WeChat application or an application market application. If the associated term is "Dae Jang Geum", an application that establishes a relationship with the associated term "Dae Jang Geum" may be a video application such as Tencent Video or iQIYI because the associated term "Dae Jang Geum" is classified into a video domain.

In this embodiment of this application, the step of determining the application corresponding to the associated term includes: determining a domain corresponding to the associated term based on a correspondence between a domain and an object in the domain, and determining the application corresponding to the associated term based on a correspondence of the application.

A domain is a domain to which different applications directly correspond, for example, a video domain, a music domain, a game domain, or an ebook domain. A domain object is a specific object that belongs to a domain. For example, a domain object that belongs to the video domain may be a specific object related to the video domain, such as "Dae Jang Geum" (a name of a TV series) or "Kim Soo-hyun" (a role related to a TV series).

The application corresponding to the associated term may be determined based on pre-established correspondences, may be determined based on preset correspondences stored on the server, or may be determined by using a keyword-application correspondence model established through machine learning or deep learning.

The foregoing correspondences include the correspondence between a domain and an object in the domain and a correspondence between the domain and an application. The associated term may first establish a relationship with a domain based on the correspondence between a domain and an object in the domain, and then establish a relationship with an application based on the correspondence between a domain and an application.

Figure 4:
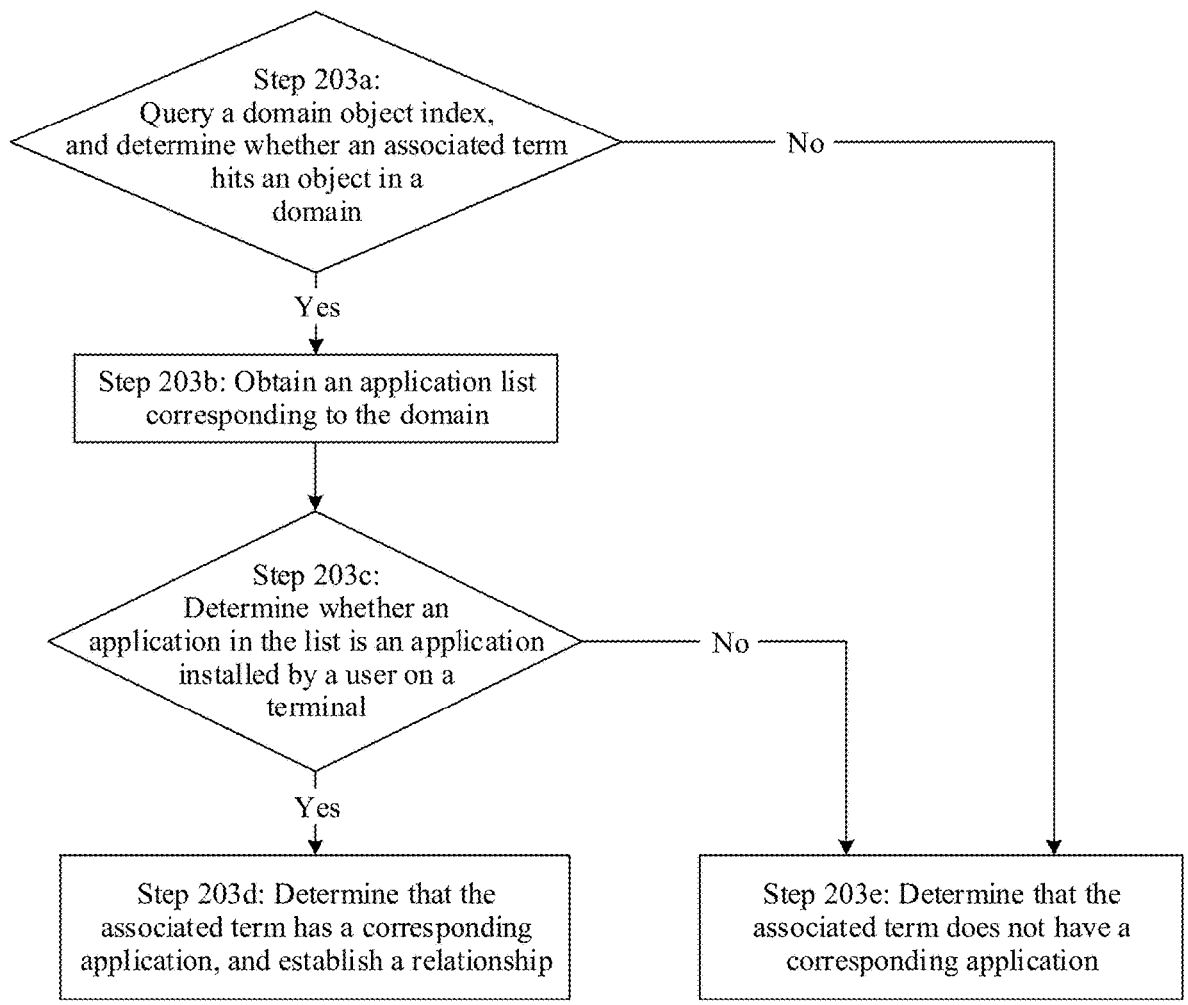
FIG. 4 is a schematic flowchart of determining, based on a correspondence, an application corresponding to an associated term according to an embodiment of this application.

With reference to FIG. 4, the following describes in detail a process of determining an application corresponding to each associated term based on the pre-established correspondences.

Step 203a: Query a domain object index, and determine whether the associated term hits an object in a domain.

The domain object index is a record of a correspondence between a domain object and a domain. The domain object index is established by collecting information about a domain object in each domain. For example, in the video domain, information such as names and playback counts of TV series and short videos is collected, to establish domain object indexes corresponding to the TV series and short videos. Information about each domain object may be obtained by crawling public data on the Internet, or may be obtained in another manner.

The domain object index further includes a popularity value of a domain object in a domain thereof, where the popularity value reflects how popular the domain object is in the domain corresponding to the domain object. After the popularity value is standardized, a score ranging from 0 to 100 is displayed in the domain object index corresponding to the domain object. A higher score indicates that the domain object is more popular in the domain corresponding to the domain object. For example, a standardized popularity value of a domain object "Dae Jang Geum" in the video domain is obtained through weighted calculation based on quantities of views, searches, and likes of the domain object.

Table 1 shows an example of a domain object index.

TABLE 1

| Domain object | Domain | Popularity value of the object in the domain thereof |
|---|---|---|
| Dae Jang Geum | Video | 37 |

One domain object may correspond to a plurality of domains. For example, a domain object "Zhidao Yige Difang Women Cengjing Laiguo" may correspond to the video domain, and may also correspond to the ebook domain. A domain object corresponding to a plurality of domains is included in a plurality of domain indexes. Popularity values of a same domain object differ in domain object indexes corresponding to different domains, and the popularity feature may be used as a basis for sorting associated terms subsequently. Table 2 shows an example in which a domain object corresponds to domain object indexes of a plurality of domains.

TABLE 2

| Domain object | Domain | Popularity value of the object in the domain thereof |
|---|---|---|
| Zhidao Yige Difang Women Cengjing Laiguo | Video | 89 |
| Zhidao Yige Difang Women Cengjing Laiguo | Ebook | 25 |

If it is determined that the associated term obtained in S202 hits one or more domain object indexes, Step 203b is performed. If the associated term obtained in S202 cannot hit any domain object index, Step 203e is performed.

Step 203b: Obtain an application list corresponding to the domain.

The application list corresponding to the domain is obtained based on domain information in the domain object index obtained in Step 203a. In a correspondence, a limited quantity of domains are manually defined, and each domain has a corresponding application list. The list includes a domain corresponding to an application, an application name, an application icon, and a link for opening the application.

The link for opening the application may be implemented by using a URL (Uniform Resource Locator) scheme. When tapping such a link, the user may be redirected to a page of the application.

The list is generated by collecting applications serving each domain. For example, applications such as Tencent Video and Youku may be collected in the video domain. The applications may be collected by crawling classification information of each application included in an application market application, so that a domain served by each application is obtained. Alternatively, the applications may be obtained in another manner.

The application in this embodiment may be a built-in application of the mobile phone, for example, a built-in application such as "Weather" or "Clock" of the mobile phone; or may be an application installed by the user, for example, an application such as "WeChat" or "iQIYI" downloaded by the user in an application market.

FIG. 12 illustrates a table showing example application lists corresponding to domains in correspondences.

Specifically, in Step 203b, information in the domain object index hit by the associated term and information in the application list of the domain are merged into a list for a subsequent determining process, and the list is referred to as an "associated term-application correspondence list" below. The associated term-application correspondence list includes a name of the associated term (a name of the domain object), a name of a corresponding domain, a popularity value of the object in the domain, a name of an application corresponding to the domain, an application icon, and a link (which, for example, is implemented by a URL scheme) for opening the corresponding application. FIG. 13 illustrates a table showing an associated term-application correspondence list obtained after domain object indexes and application lists of domains are merged in Step 103b.

If an associated term (a domain object) corresponds to a plurality of domains, the associated term is extended to obtain extended terms corresponding to the plurality of domains, and is represented by a plurality of records in the associated term-application correspondence list obtained through merging. For the user, the associated term corresponds to a plurality of domains. When the user selects an associated term of a corresponding domain, the user may choose to open an application of the corresponding domain.

Step 203c: Determine whether an application in the list is an application installed by the user on the terminal.

Specifically, all applications in an application registration list on the terminal may constitute a set, all applications corresponding to an associated term in a record in the associated term-application correspondence list obtained in Step 203b constitute another set, and an intersection operation is performed on the two sets. If there is no intersection, it indicates that no application corresponding to a domain to which the associated term belongs is installed on the terminal, and Step 203e is performed. If there is an intersection, it indicates that one or more applications corresponding to the domain to which the associated term belongs are installed on the terminal, and Step 203d is performed.

Step 203d: Determine that the associated term has a corresponding application, and establish a relationship.

Specifically, an application in the intersection obtained in Step 203c is determined as the application corresponding to the associated term, and the associated term-application correspondence list is updated. For example, a set of applications corresponding to the associated term "Zhidao Yige Difang Women Cengjing Laiguo" in a record in the list obtained in Step 203b in the video domain is {"Tencent Video", "iQIYI", "Youku" }. A set of applications in the application registration list on the terminal is {"Weather", "Tencent App Store", "Clock", "Tencent Video", "iQIYI" }. An intersection of the two sets is {"Tencent Video", "iQIYI" }. Then, it is determined that applications corresponding to the associated term "Zhidao Yige Difang Women Cengjing Laiguo" in the video domain are "Tencent Video" and "iQIYI", and application information corresponding to the associated term "Zhidao Yige Difang Women Cengjing Laiguo" in the associated term-application correspondence list in the video domain is updated.

Step 203e: Determine that the associated term does not have a corresponding application.

Specifically, in Step 203a, if the associated term cannot hit a record in a domain object index, it is determined that the associated term does not have a corresponding application.

In Step 203e, if an application corresponding to the associated term in a record in the associated term-application correspondence list in a domain is not installed on the terminal, that is, there is no intersection between a set of applications corresponding to the associated term in a record in the associated term-application correspondence list in a domain and a set of applications installed on the terminal, it is determined that the associated term does not have a corresponding application in the domain. In addition, the record of application information corresponding to the associated term in the associated term-application list in the domain is deleted. For example, a set of applications corresponding to the associated term "Zhidao Yige Difang Women Cengjing Laiguo" in a record in the list obtained in Step 203b in the ebook domain is {"WeChat Read" }, and the set of applications in the application registration list on the terminal is {"Weather", "Tencent App Store", "Clock", "Tencent Video", "iQIYI" }. There is no intersection between the two sets. Therefore, it may be determined that the associated term "Zhidao Yige Difang Women Cengjing Laiguo" does not have a corresponding application in the ebook domain, and a related information record of the associated term "Zhidao Yige Difang Women Cengjing Laiguo" corresponding to the ebook domain is deleted from the associated term-application list.

FIG. 14 illustrates a table showing an associated term-application correspondence list obtained after Step 203d and/or Step 203e are/is performed on the associated term-application correspondence list shown in FIG. 13. It is assumed that a set of applications corresponding to the associated term "Zhidao Yige Difang Women Cengjing Laiguo" in the video domain is {"Tencent Video", "iQIYI", "Youku" }, a set of applications corresponding to the associated term "Zhidao Yige Difang Women Cengjing Laiguo" in the ebook domain is {"WeChat Read" }, and the set of applications in the application registration list on the terminal is {"Weather", "Tencent App Store", "Clock", "Tencent Video", "iQIYI" }.

Steps 203a to 203d are repeated to determine a correspondence between each associated term obtained in Step 202 and an application.

Specifically, Steps 203a to 203e are performed on the associated terms (a quantity of the associated terms is limited) obtained in Step 102, to obtain a correspondence between each associated term and an application installed on the terminal, and obtain an associated term-application correspondence list that is complete for each associated term. For example, it is assumed that all associated terms obtained in Step 202 are "Zhihu", "Zhishi Chanquan", "Zhishi Chanquan Fazhan Zhuangkuang", and "Zhidao Yige Difang Women Cengjing Laiguo"; and all applications in the application registration list on the terminal are "Weather", "Tencent App Store", "Clock", "Tencent Video", and "iQIYI". FIG. 15 illustrates a table showing a complete associated term-application correspondence list corresponding to a limited quantity of associated terms obtained in Step 202.

S204: Display the associated term and an identifier corresponding to the associated term, where the identifier is used to open the application corresponding to the associated term.

Figure 5:
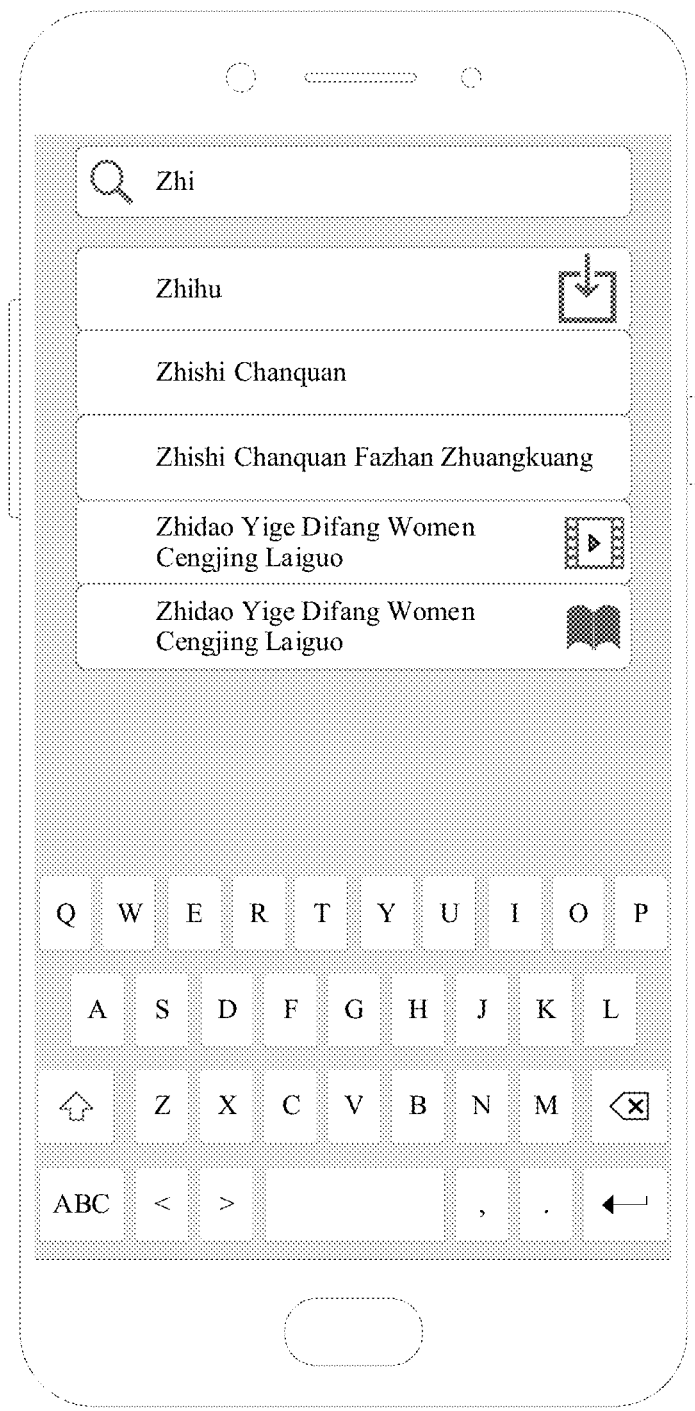
FIG. 5 is a schematic diagram of a scenario in which associated terms are displayed according to an embodiment of this application.

FIG. 5 is a schematic diagram of a scenario in which results of associated terms are displayed according to an embodiment of this application. In Step S201, the search term "Zhi" entered by the user in the search bar is obtained. In Step S202, four associated terms corresponding to the search term are determined: "Zhihu", "Zhishi Chanquan", "Zhishi Chanquan Fazhan Zhuangkuang", and "Zhidao Yige Difang Women Cengjing Laiguo". In Step S203, it is determined that associated terms having corresponding domain identifiers are: "Zhihu" and "Zhidao Yige Difang Women Cengjing Laiguo". In Step S204, five associated-term display boxes are listed below the search bar. The associated-term display boxes display four associated terms: "Zhihu", "Zhishi Chanquan", "Zhishi Chanquan Fazhan Zhuangkuang", and "Zhidao Yige Difang Women Cengjing Laiguo". In addition, corresponding domain identifiers for associated terms "Zhihu" and "Zhidao Yige Difang Women Cengjing Laiguo" are also displayed in associated-term display boxes corresponding to the associated terms.

Figure 6:
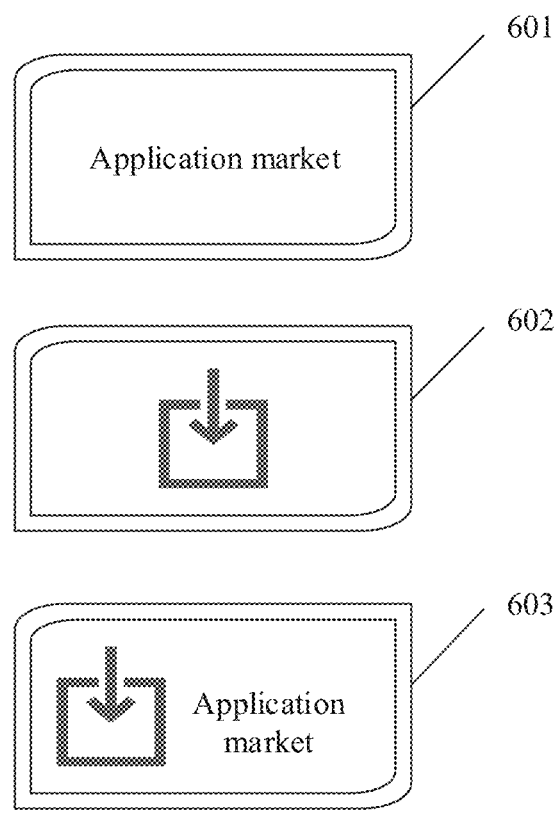
FIG. 6 is a schematic diagram of identifiers according to an embodiment of this application.

In some embodiments, the identifier may be a text identifier, an image identifier, or a text-image identifier. For example, as shown in FIG. 6, an identifier 21 is the text identifier, an identifier 22 is the image identifier, and an identifier 23 is the text-image identifier. Alternatively, the identifier may be presented in another identifier form, which is not listed herein.

In some embodiments, a display form of the associated term in the associated-term display box is determined based on the correspondence, obtained in S203, between an associated term and an application. The correspondence between an associated term and an application may be obtained based on the associated term-application correspondence list. Specifically, for a to-be-displayed associated term, if there is no application that establishes a relationship with the associated term, the associated term is displayed as a common associated term. If there is an application that establishes a relationship with the associated term, an identifier used to open the application corresponding to the associated term is added behind the associated term when the associated term is displayed.

In some embodiments, an associated term and an identifier corresponding to the associated term may be displayed above or below the search bar. A specific position in which the associated term and the identifier corresponding to the associated term are displayed is determined based on a position of the search bar on a search interface. Each associated term and an identifier corresponding to the associated term are displayed in an associated-term display box. Associated-term display boxes are displayed above or below the search bar in ascending or descending order based on lengths of associated terms.

In some embodiments, before associated terms and identifiers corresponding to the associated terms are displayed, the associated terms are further sorted. The associated terms may be sorted based on text lengths of the associated terms. If the lengths of the associated terms are the same, the associated terms may be sorted in alphabetical order of initials of the associated terms. For example, the search term entered by the user is "we", and extended associated terms are "wechat", "weather", "wet", and "wegame". The three associated terms are sorted into the following order based on an extension degree: "wet", "wechat", "wegame", and "weather".

In some embodiments, associated terms may be further sorted based on popularity values of the associated terms. The popularity value of the associated term may be obtained by counting a quantity of times that all users on the server side search for the associated term, or may be obtained by counting historical search records of the associated term by the user on the terminal side. A plurality of associated terms obtained through extension are sorted based on popularity values of the associated terms.

In some embodiments, one associated term may correspond to applications serving a plurality of domains. In other words, there are a plurality of records of the associated term and applications corresponding to the associated term in the associated term-application correspondence list. An associated-term display box for the foregoing associated term is extended to obtain a plurality of associated-term display boxes. The plurality of associated-term display boxes display same text but different domain identifiers behind the keyword text. The domain identifiers may be used to open applications in different domains. A plurality of associated terms extended based on the associated term are sorted in descending order based on a comprehensive domain confidence score that is calculated based on a corresponding user preference value for each domain and a popularity value of the associated term in each domain.

Specifically, a popularity value of the associated term in a domain may be obtained by querying the associated term-application correspondence list, and a terminal user preference value may be obtained by querying a statistics table about user preference values for domains. The comprehensive domain confidence score is obtained by performing a sum operation on a product of the popularity value of the associated term in the domain and a corresponding preset weight coefficient and a product of the terminal user preference value and a corresponding preset weight coefficient. For example, a popularity value of an associated term in a domain and a terminal user preference value are 89 and 73 respectively, and preset weight coefficients for the popularity value of the associated term in the domain and the terminal user preference value are 0.6 and 0.4 respectively. A sum operation is performed on a product of the popularity value of the associated term in the domain and a corresponding preset weight coefficient and a product of the terminal user preference value and a corresponding preset weight coefficient, that is, 0.6×89+0.4×73=82.6, to obtain a comprehensive domain confidence score.

The statistics table about user preference values for domains collects statistics on a quantity of times that the user daily uses an application and duration in which the application is used, obtains a standardized user preference value for a domain based on a list of applications corresponding to the domain, and records the standardized user preference value for the domain as a value ranging from 0 to 100 in the statistics table about user preference values for domains. Table 3 shows an example of a statistics table about user preference values for domains.

TABLE 7

| Domain name | User preference value for a domain |
|---|---|
| Video | 73 |
| Music | 15 |
| Ebook | 9 |
| ... | ... |

In this embodiment of this application, a domain identifier corresponding to an associated term is used to open an application corresponding to the associated term corresponding to the domain identifier. Specifically, when the user taps a domain identifier in an associated-term display box, a corresponding application menu in which the user may perform selection is displayed. Then, the associated term-application correspondence list is queried to display an application name and an application icon that correspond to the associated term in the associated-term display box. The user selects an application option in the menu, and opens a corresponding application based on a link that is recorded in the associated term-application correspondence list and that is used to open the application, to be redirected to an interface of the corresponding application.

Figure 7A:
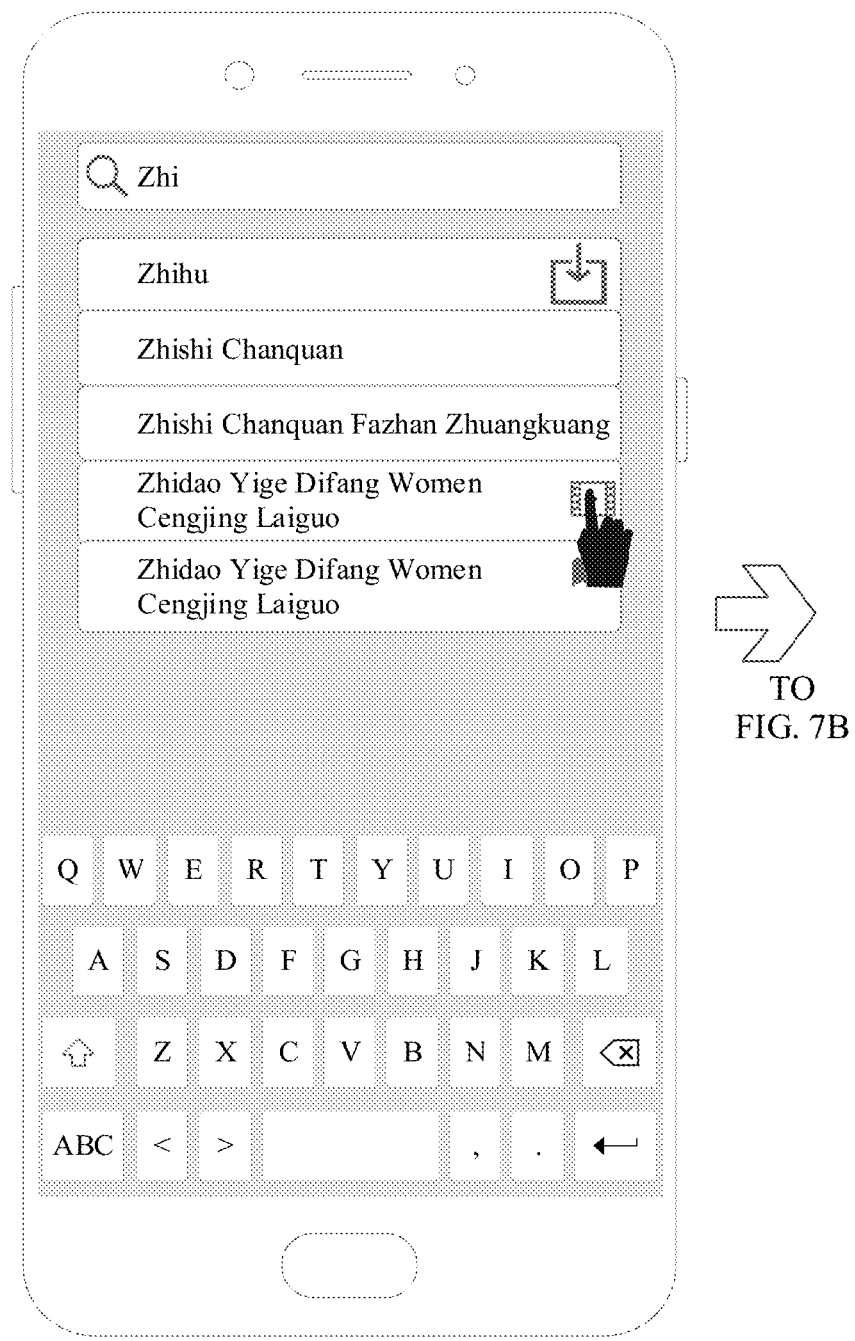
FIG. 7A to FIG. 7J are schematic diagrams of several scenarios in which interface switching is performed when associated terms are displayed.
Figure 7B:
Figure 7C:
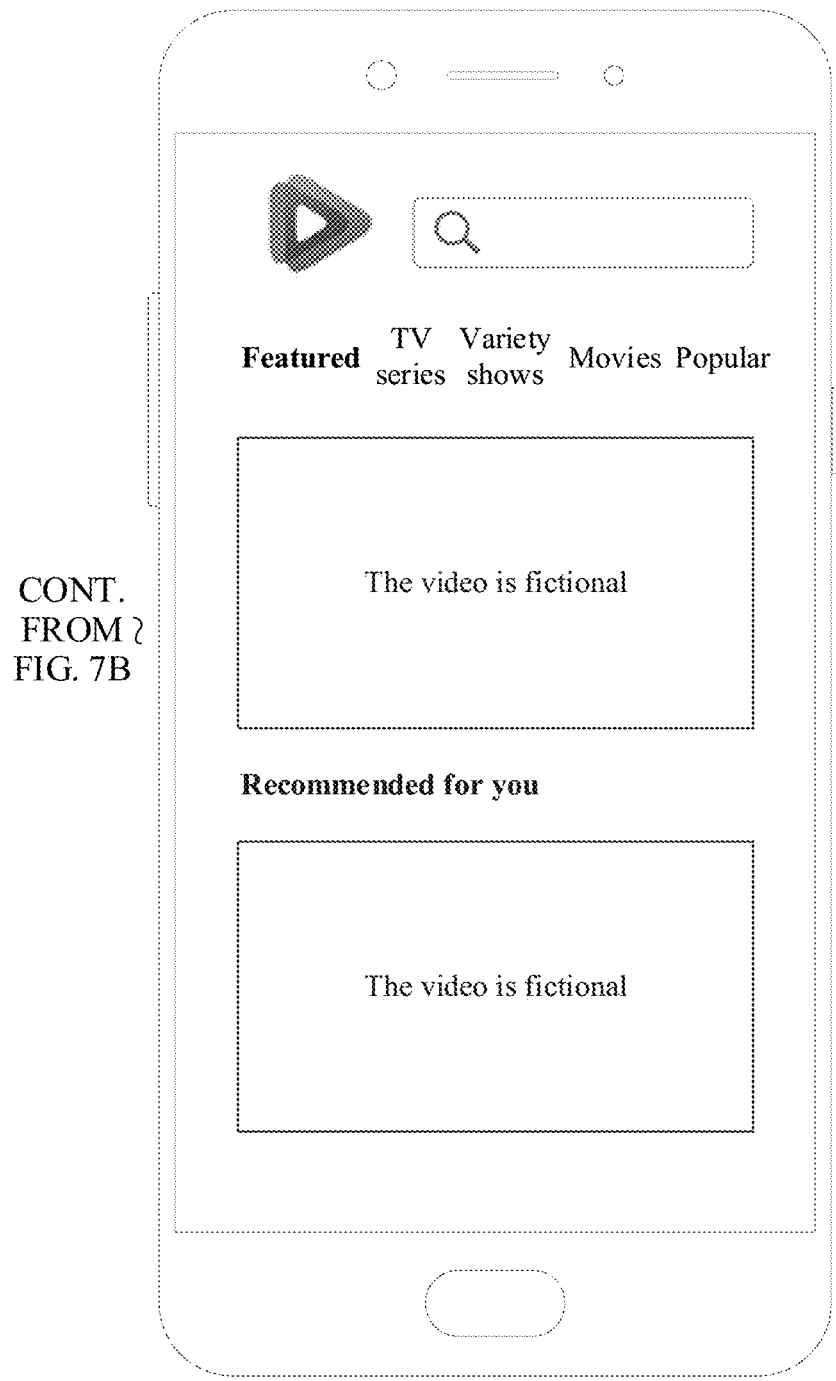
Figure 7D:
Figure 7E:
Figure 7F:
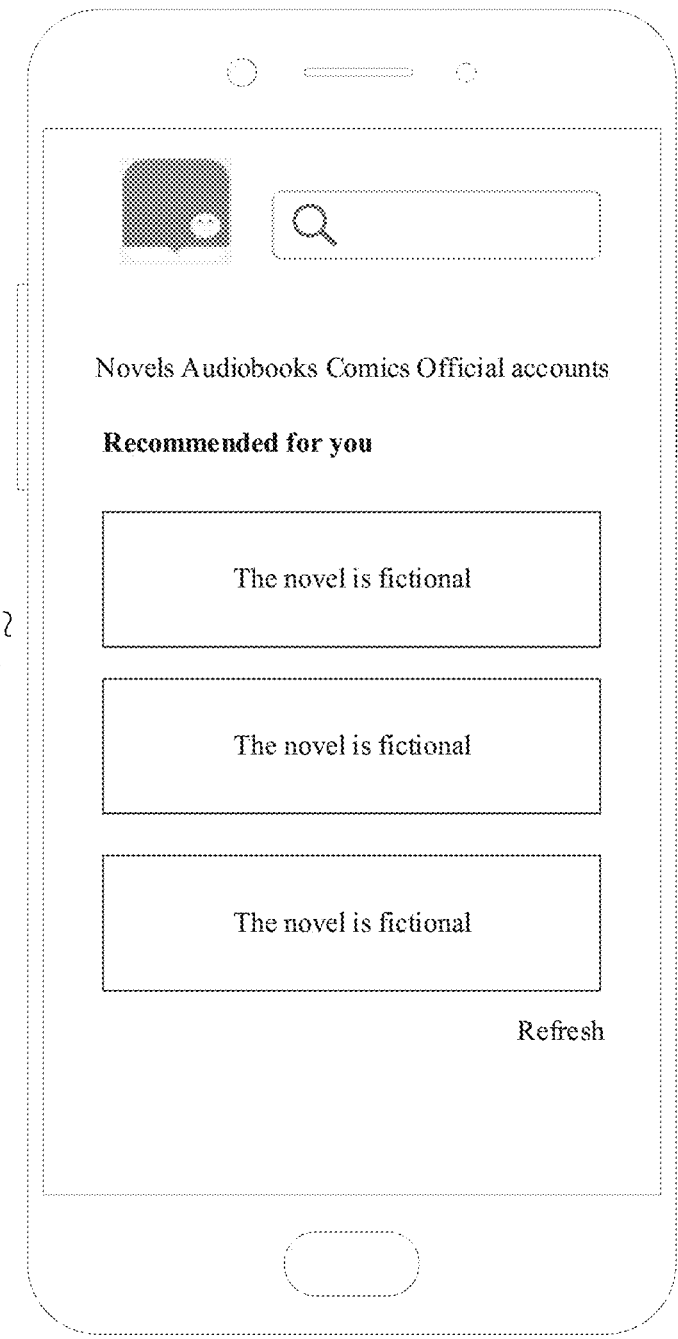
Figure 7G:
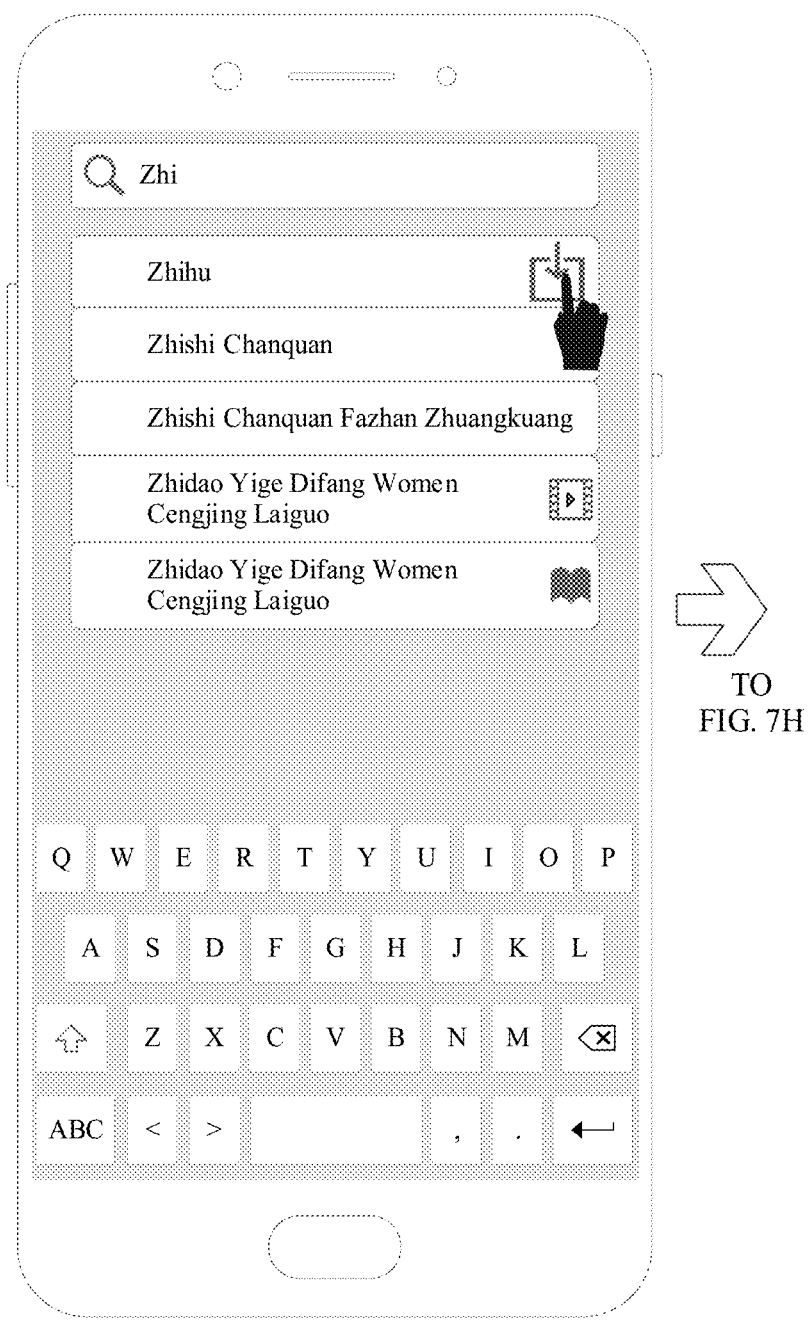
Figure 7H:
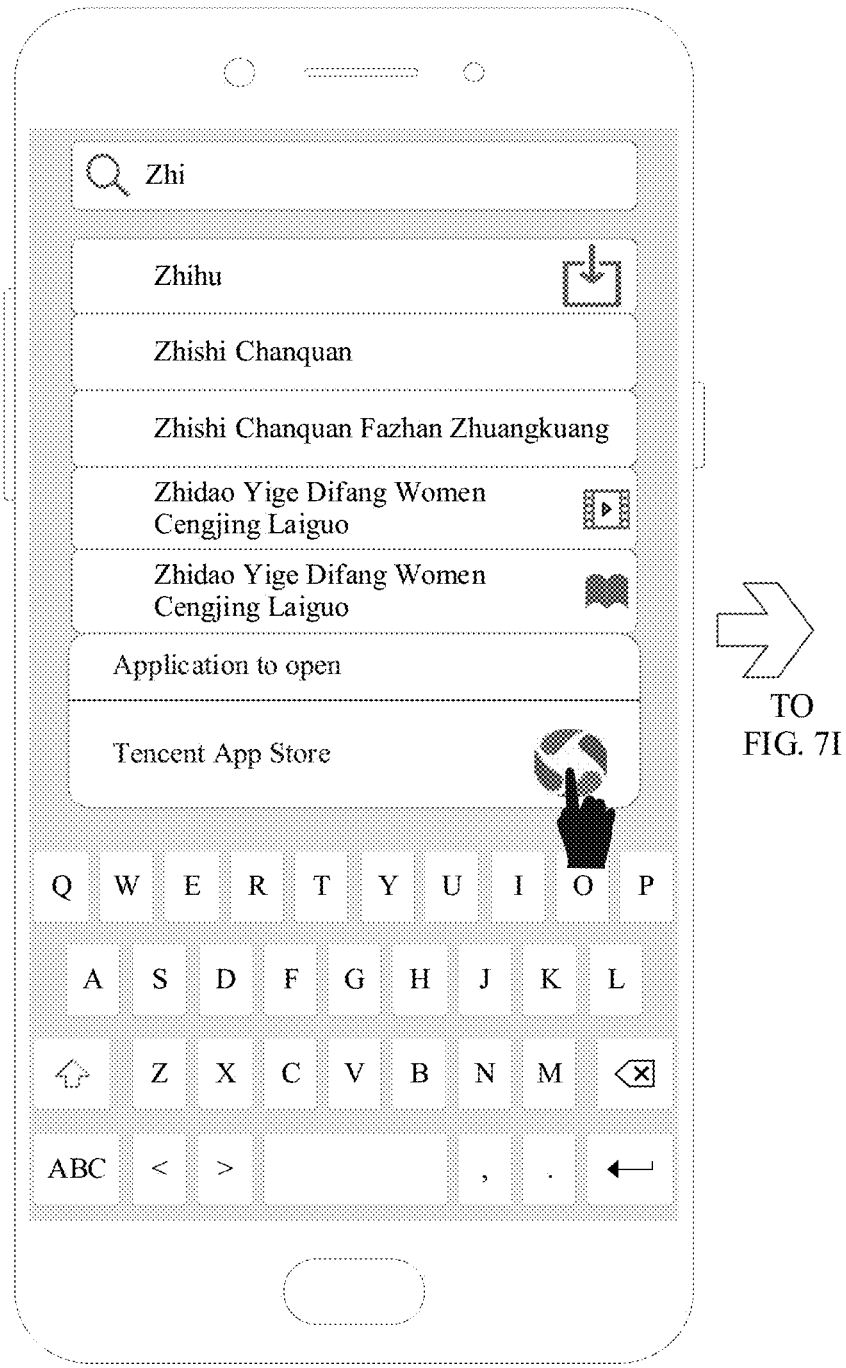
Figure 7I:
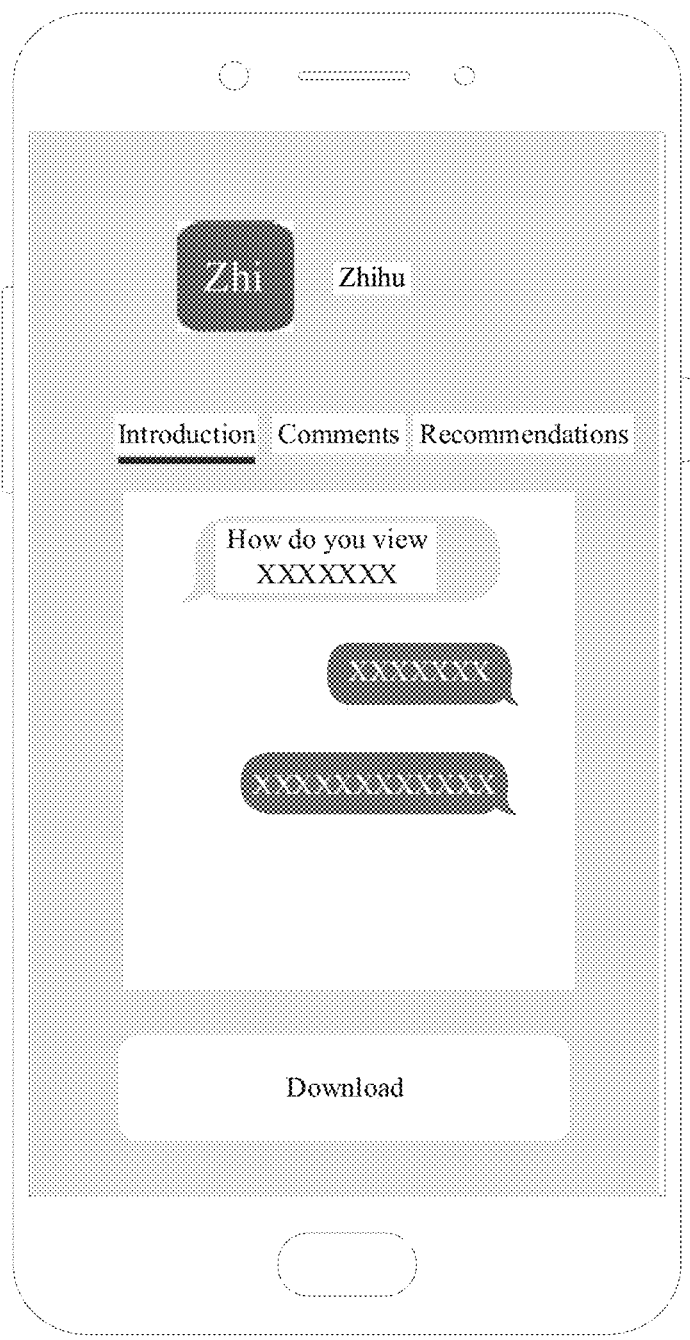
Figure 7J:
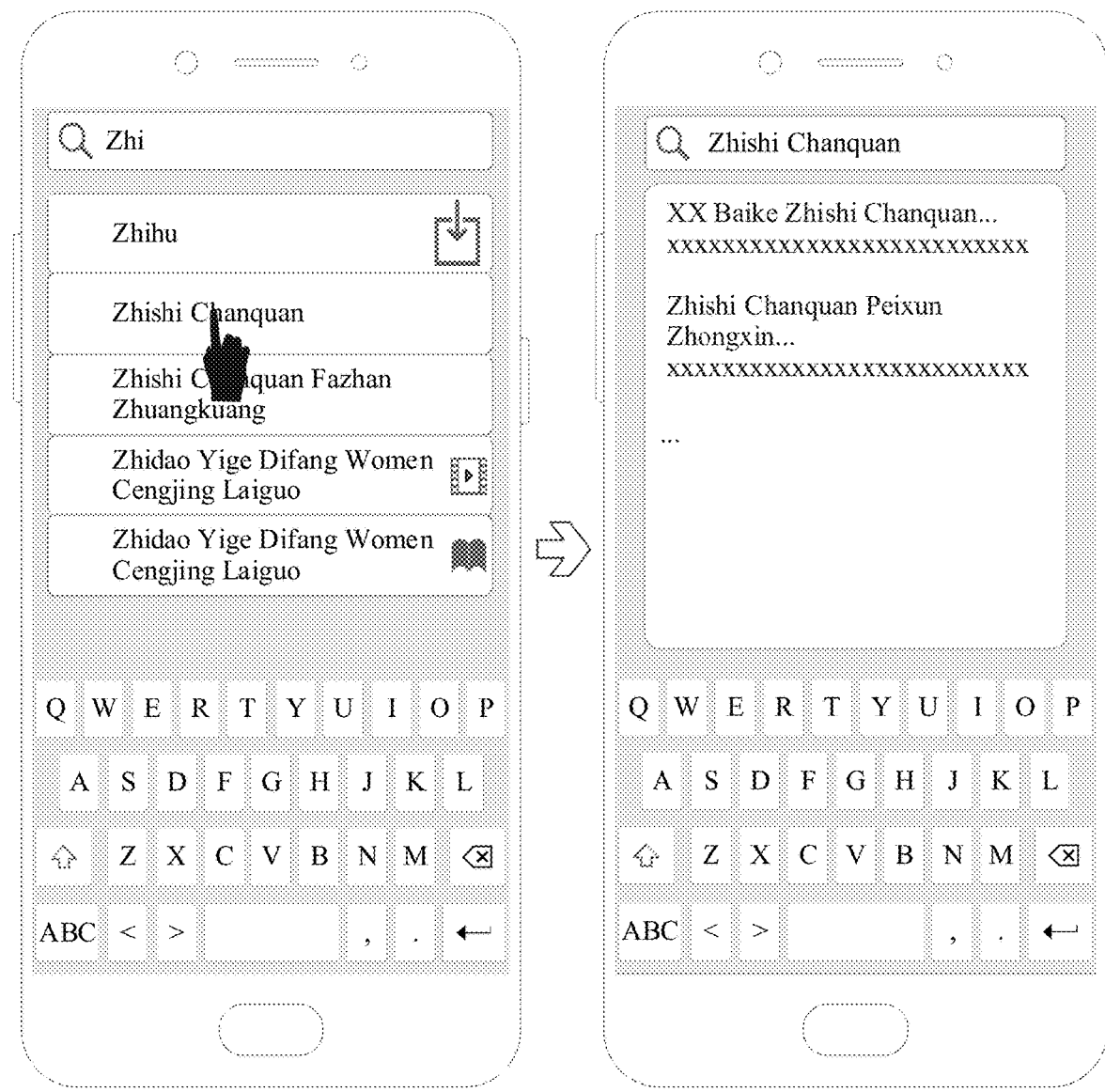

FIG. 7A to FIG. 7J are schematic diagrams of a plurality of scenarios in which display interfaces of associated terms are switched in an embodiment of this application. In Step S201, the search term "Zhi" entered by the user in the search bar is obtained. In Step S202, four associated terms corresponding to the search term are determined: "Zhihu", "Zhishi Chanquan", "Zhishi Chanquan Fazhan Zhuangkuang", and "Zhidao Yige Difang Women Cengjing Laiguo". In Step S203, it is determined that associated terms having corresponding domain identifiers are: "Zhihu" and "Zhidao Yige Difang Women Cengjing Laiguo". In Step S204, five associated-term display boxes are listed below the search bar. The associated-term display boxes display four associated terms: "Zhihu", "Zhishi Chanquan", "Zhishi Chanquan Fazhan Zhuangkuang", and "Zhidao Yige Difang Women Cengjing Laiguo". In addition, corresponding domain identifiers for associated terms "Zhihu" and "Zhidao Yige Difang Women Cengjing Laiguo" are also displayed in associated-term display boxes corresponding to the associated terms. As shown in FIG. 7A to FIG. 7F, when the user taps domain identifiers corresponding to the associated term "Zhidao Yige Difang Women Cengjing Laiguo" (corresponding identifiers in the figure are respectively an image identifier for video playing and a book image identifier), corresponding application menus for the user to perform selection are opened. When choosing to open an application "Tencent Video" corresponding to the video domain, the user taps the option to open the application "Tencent Video" and go to an interface of the application "Tencent Video". Alternatively, when choosing to open an application "WeChat Read" corresponding to the ebook domain, the user taps the option to open the application "WeChat Read" and go to an interface of the application "WeChat Read". As shown in FIG. 7G, FIG. 7H, and FIG. 7I, when the user taps a domain identifier corresponding to the associated term "Zhihu" (a corresponding identifier in the figure is an image identifier of a download arrow), a corresponding application menu for the user to perform selection is opened. When choosing to use an application "Tencent App Store", the user taps this option to open the application "Tencent App Store" and go to an interface of the application "Tencent App Store". As shown in FIG. 7J, when the user taps the associated term "Zhishi Chanquan", a search result of the associated term "Zhishi Chanquan" that is used as a search term is displayed.

Figure 8:
FIG. 8 is a schematic diagram of a scenario in which interface switching is performed when associated terms are displayed according to an embodiment of this application.

In some embodiments, in Step 204, when the associated term belongs to a domain of an application type and the associated term is used as an application, an identifier used to open the associated term may be displayed in an associated-term display box if the application is installed on the terminal device. The identifier may be tapped to directly open the application and go to a corresponding interface. As shown in FIG. 8, an identifier used to open an application "Zhihu" is displayed in an associated-term display box corresponding to the associated term "Zhihu". The identifier may be tapped to directly open the application "Zhihu" and go to a corresponding interface of the application "Zhihu".

Figure 9:
FIG. 9 is a schematic diagram of a scenario in which interface switching is performed when associated terms are displayed according to an embodiment of this application.

In some embodiments, in Step 204, when the associated term belongs to the domain of the application type and the associated term is used as an application, a download identifier may be displayed in an associated-term display box if the application is not installed on the terminal device. The identifier may be used to open or go to an application market application to download the application, or used to download the application directly in a browser. As shown in FIG. 9, an identifier used to download the application "Zhihu" is displayed in an associated-term display box corresponding to the associated term "Zhihu". The identifier may be tapped to directly open an application market application (such as "Tencent App Store") and go to a corresponding interface of the application market application to download the application "Zhihu".

Figure 10A:
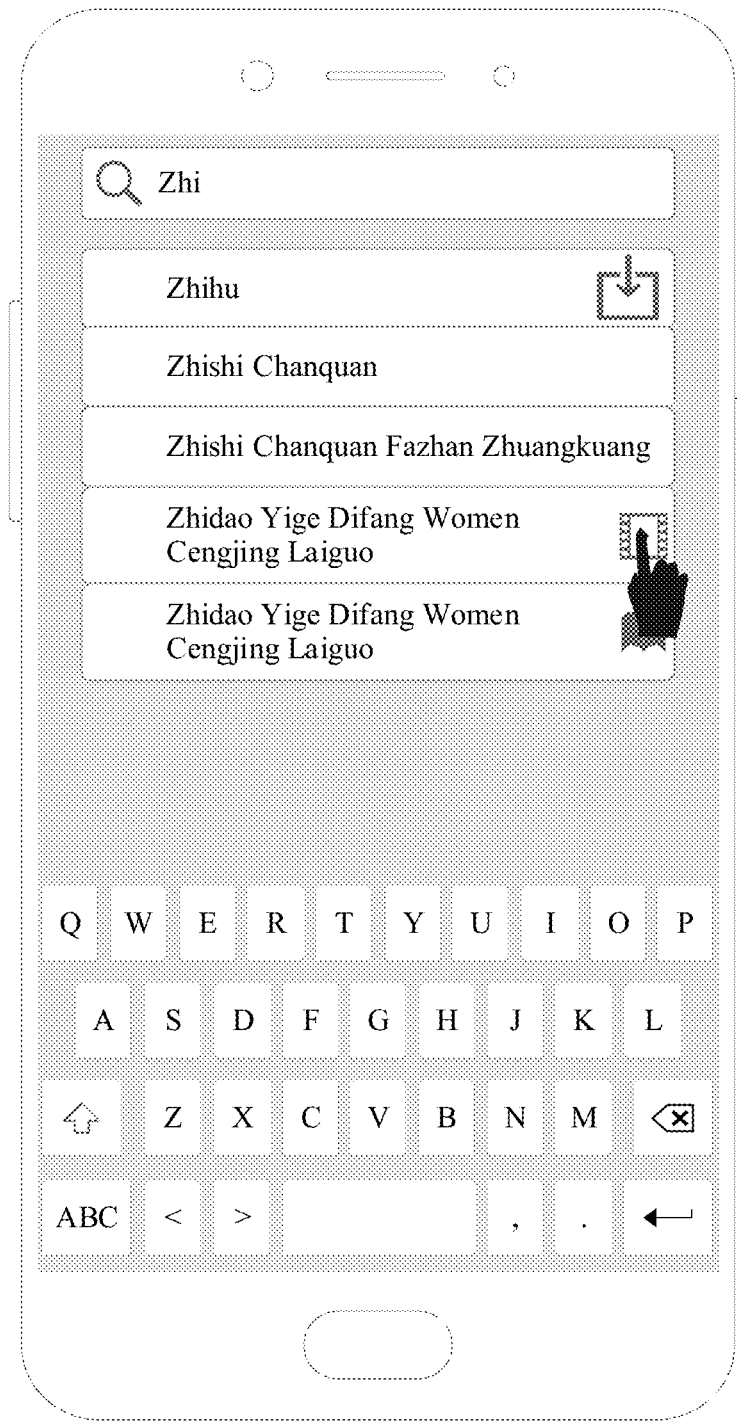
FIG. 10A, FIG. 10B, and FIG. 10C are schematic diagrams of a scenario in which interface switching is performed when associated terms are displayed according to an embodiment of this application.
Figure 10B:
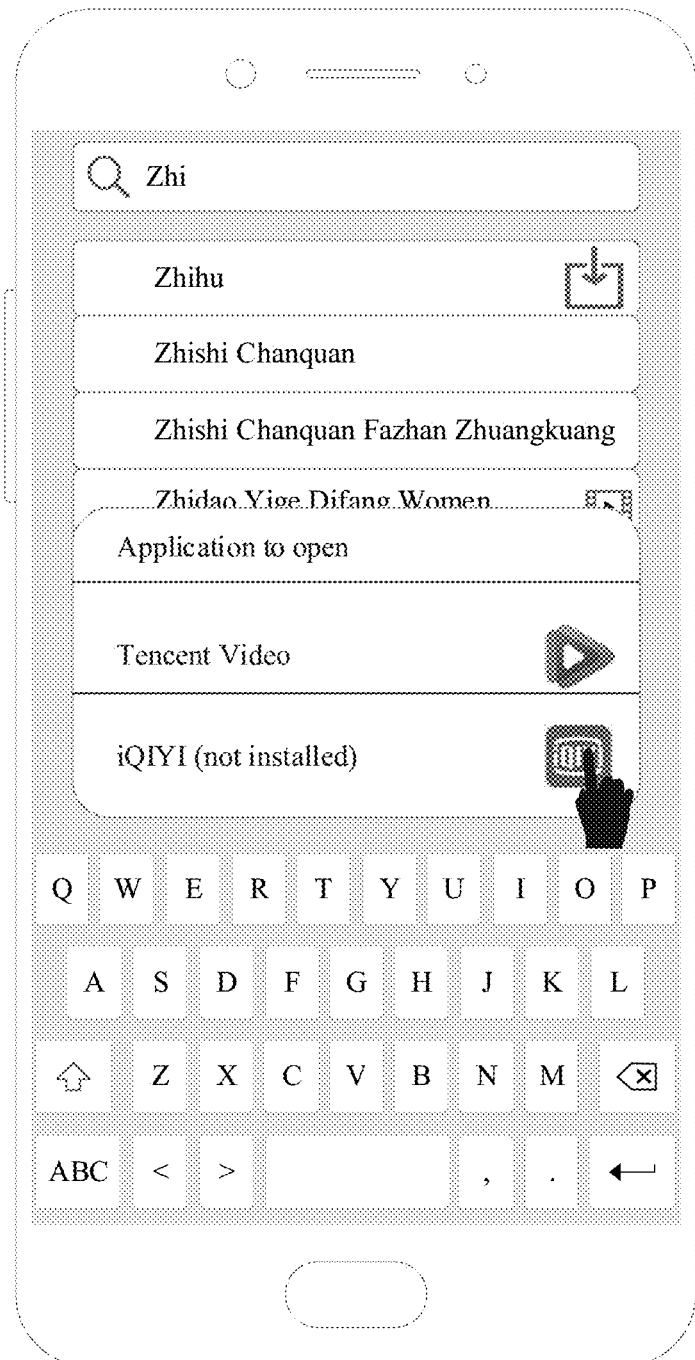
Figure 10C:
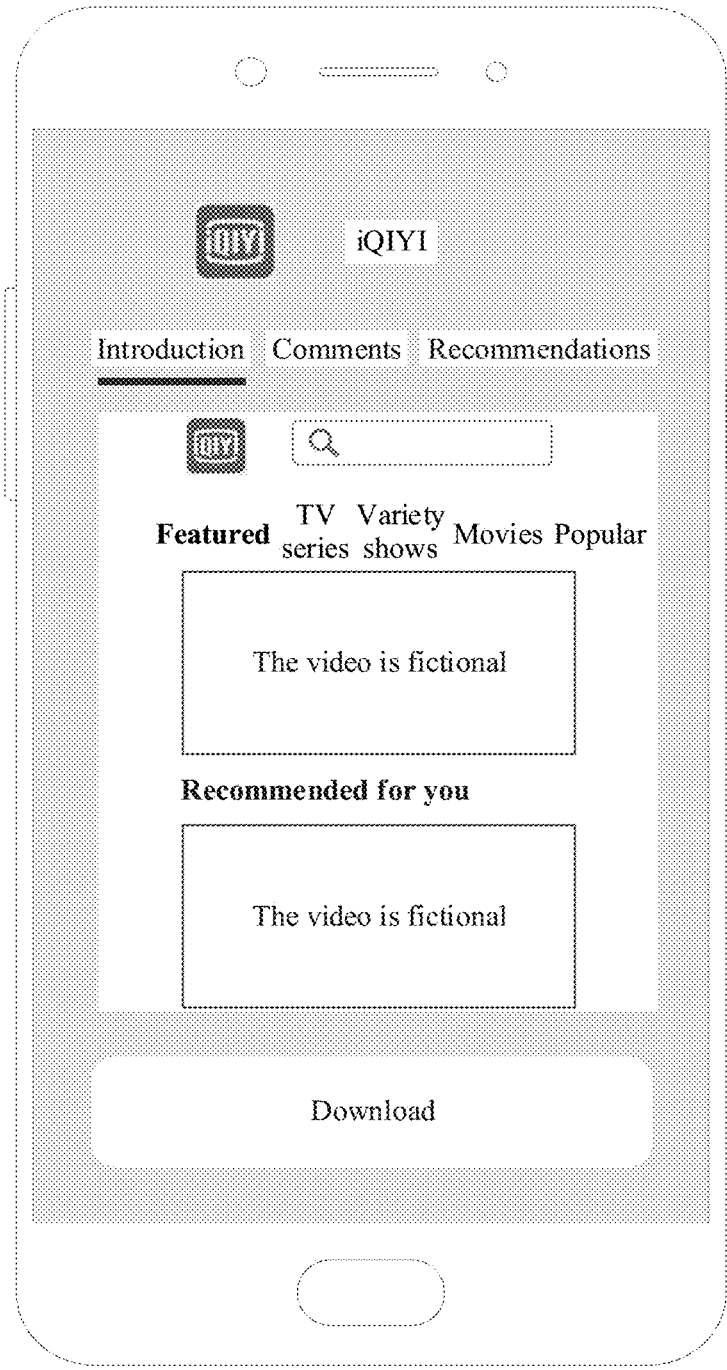

In some embodiments, in Step 204, after the user opens a domain identifier corresponding to a specific associated term, an application corresponding to the domain is displayed. The application may be not installed on the terminal device used by the user but is relatively popular in the domain corresponding to the application. When the user taps the application, the application is not opened because the application is not installed on the terminal device, but an application market application is opened. According to the foregoing display method, the user may extend an application on the terminal device through the associated term, and download an application related to a domain in which the user is interested. As shown in FIG. 10A, FIG. 10B, and FIG. 10C, after the user opens a domain identifier corresponding to the associated term "Zhidao Yige Difang Women Cengjing Laiguo", applications "Tencent Video" and "iQIYI" and application icons corresponding to the applications are displayed. The application "iQIYI" is not installed on the terminal device. When the user taps "iQIYI"

or the application icon of "iQIYI", a corresponding interface that is of an application market application and on which the application "iQIYI" can be downloaded is redirected to or opened. The user can download the "iQIYI" application.

It should be noted that a form of a domain object index, an application list corresponding to a domain, or a statistics table about user preference values for domains in this embodiment is not limited to an index or a list. The index and the list may be stored in a storage area of the terminal device, for example, stored in a database. This is not specifically limited in this application.

According to the method shown in FIG. 2, when a user uses a search engine of a terminal device to perform a search, an associated term matching an entered search term and a domain identifier corresponding to the associated term may be displayed. The user taps the domain identifier to open an application menu in which the user may perform selection and that corresponds to the domain identifier. The user selects and taps a corresponding application to go to an interface of the corresponding application. This centralizes scattered scenarios such as an application download, a weather query, video playback, and music playback into a display scenario of associated terms, and provides the user with richer, diversified, and one-stop experience.

It should be understood that a sequence number of a step in the foregoing embodiment does not mean an order of execution, and an order of execution of each process should be determined by a function and internal logic of the process, and should not constitute any limitation on an implementation process of this embodiment of this application.

The foregoing mainly describes the solution in this embodiment of this application from a perspective of a method execution process. It can be understood that to implement the foregoing functions, the terminal device includes a corresponding hardware structure and/or software module for performing each of the functions. A person skilled in the art should easily realize that, with reference to the examples described in embodiments disclosed in this specification, units and algorithm steps can be implemented in a form of hardware or a combination of hardware and computer software in this application. Whether a function is performed by hardware or hardware driven by computer software depends on particular applications and design constraints of the technical solution. A person skilled in the art may use different methods to implement the described functions for each particular application, but it should not be considered that the implementation goes beyond the scope of this application.

In embodiments of this application, the terminal device may be divided into function modules based on the foregoing method examples. For example, each function module may be obtained through division based on each corresponding function, or two or more functions may be integrated into one processing module. The integrated module may be implemented in a form of hardware, or may be implemented in a form of a software functional module. It should be noted that, in embodiments of this application, division into the modules is an example and is merely logical function division, and may be other division in actual implementation.

Figure 11:
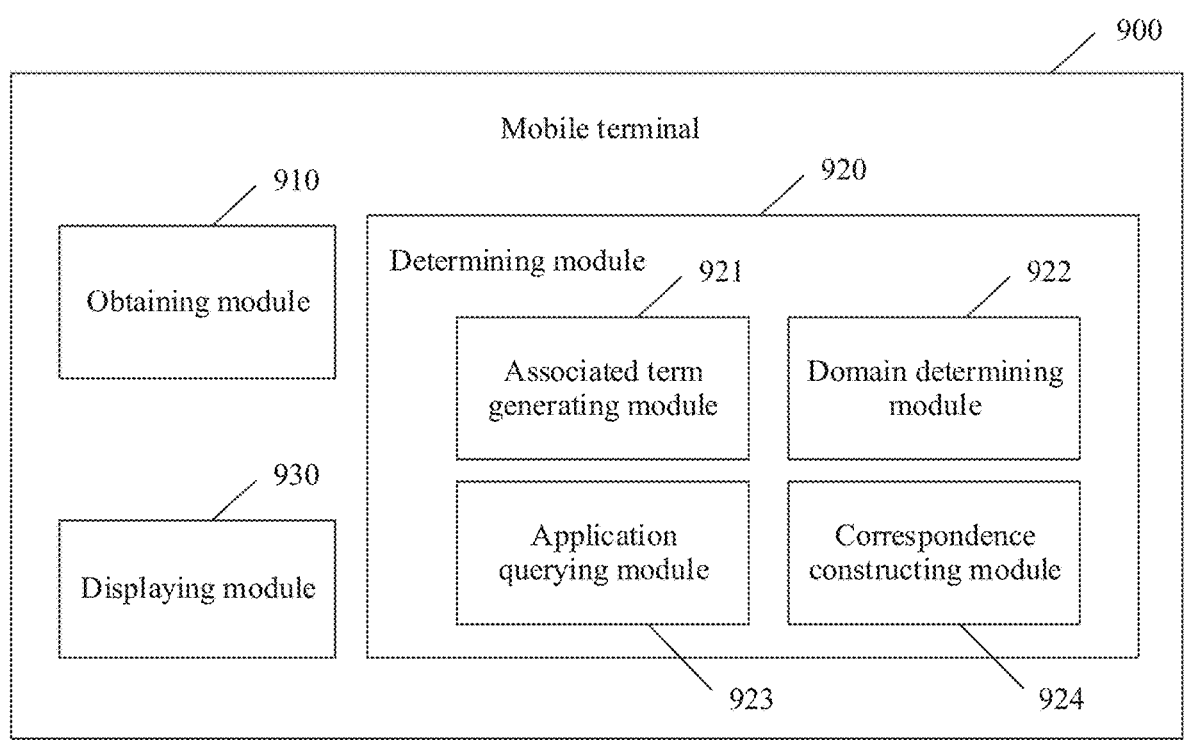
FIG. 11 is a schematic diagram of a structure of another terminal device according to an embodiment of this application.

FIG. 11 is a schematic diagram of a structure of a terminal device according to an embodiment of this application. As shown in FIG. 10, a terminal device 900 includes an obtaining module 910, a determining module 920, and a displaying module 930. The determining module includes an associated term generating module 921, a domain determining module 922, an application querying module 923, and a correspondence constructing module 924.

The obtaining module 910 is configured to obtain a search term entered in a search bar.

The determining module 920 is configured to determine an associated term corresponding to the search term.

The determining module 920 is further configured to determine an application corresponding to the associated term.

The associated term generating module 921 in the determining module 920 is configured to extend a preset quantity of associated terms. A quantity of associated terms is preset to limit the quantity of associated terms. This facilitates subsequent display of the associated terms.

The associated term generating module 921 in the determining module 920 is further configured to match, based on a user search record, an associated term including the search term. A search record is a record of a search performed by a terminal user. Therefore, the matched associated term better satisfies a search intention of the user.

The associated term generating module 921 in the determining module 920 is further configured to determine, based on an association result returned by a server, the associated term corresponding to the search term. For search terms unfamiliar to the user, association results, from the server, of the search terms may be used to provide popular associated terms for the user.

The domain determining module 922 in the determining module 920 is configured to determine a domain corresponding to the associated term based on a correspondence between a domain and an object in the domain.

The application querying module 923 in the determining module 920 is configured to determine the application corresponding to the associated term based on a correspondence between the domain and an application.

The correspondence constructing module 924 in the determining module 920 is configured to establish the correspondence between a domain and an object in the domain, where the correspondence includes a name of the domain, a name of the object, and a popularity value of the object in the domain.

The correspondence constructing module 924 in the determining module 920 is further configured to create a domain object index, where the domain object index stores the correspondence between a domain and an object in the domain.

The correspondence constructing module 924 in the determining module 920 is further configured to establish the correspondence between the domain and an application, where the information includes a name of the application, an application icon, and a link associated with the application.

The correspondence constructing module 924 in the determining module 920 is further configured to establish an application list corresponding to the domain, where the list stores the correspondence between the domain and an application.

The determining module 920 is further configured to determine, based on the domain corresponding to the associated term and a relationship between the domain and an application, the application corresponding to the associated term. In this manner, a relationship is established between the associated term and a domain. In addition, a correspondence between the domain and an application is used to establish a correspondence between the associated term and the application. In this way, the associated term is associated with the application.

The displaying module 930 is configured to display an associated term generation result, where the associated term generation result includes the associated term and a domain identifier corresponding to the associated term, and the domain identifier is used to open the application corresponding to the associated term corresponding to the domain identifier.

The displaying module 930 is further configured to sort a plurality of associated terms and identifiers corresponding to the associated terms.

The displaying module 930 is further configured to sort the associated terms based on text lengths of the associated terms. The sorted associated terms are displayed in a tidier manner. This is more user-friendly to view the associated terms.

The displaying module 930 is further configured to perform sorting based on a user preference value for a domain corresponding to the associated term and a popularity value in the domain. The sorted associated terms better meet preference of the user. This provides a personalized service for the user.

The displaying module 930 is further configured to display the identifier corresponding to the associated term, where the identifier includes an application icon of the application corresponding to the associated term. The user directly taps the identifier to open or go to a corresponding application interface, which is simple and quick.

The displaying module 930 is further configured to display the identifier corresponding to the associated term, where the identifier includes the domain identifier corresponding to the associated term. A first menu is used to display the application icon of the application corresponding to the associated term, and the application icon is used to directly open the application. The user directly taps the identifier to open a menu that includes an application icon related to the domain corresponding to the associated term. The menu displays different applications in a same domain for the user to select, which meets diversified requirements of the user.

It should be noted that content such as information exchange between and an execution processes of the foregoing modules is based on a same concept as the method embodiment of this application. For details about specific functions and technical effects of the content, refer to the method embodiment. The details are not described herein.

According to the terminal device shown in FIG. 11, when a user uses a search engine of the terminal device to perform a search, an associated term matching an entered search term and a domain identifier corresponding to the associated term may be displayed. The user taps the domain identifier to open an application menu in which the user may perform selection and that corresponds to the domain identifier. The user selects and taps a corresponding application to go to an interface of the corresponding application. This centralizes scattered scenarios such as an application download, a weather query, video playback, and music playback into a display scenario of associated terms, and provides the user with richer, diversified, and one-stop experience.

An embodiment of this application further provides a computer storage medium. The computer storage medium is configured to store a computer program used for electronic data exchange, and the computer program enables a computer to perform some or all of the steps of any method that is for displaying an associated term and that is described in the foregoing method embodiment.

An embodiment of this application further provides a computer program product. The computer program product includes a non-transitory computer-readable storage medium storing a computer program. The computer program is operable to enable a computer to perform some or all of the steps of any method that is for displaying an associated term and that is described in the foregoing method embodiment.

Embodiments of this application are described in detail above. The principle and the implementation of this application are described in this specification through specific examples. The descriptions about embodiments are merely provided to help understand the method and core ideas of this application. In addition, a person of ordinary skill in the art can make variations and modifications to this application in terms of the specific implementations and application scopes according to the ideas of this application. Therefore, the content of this specification shall not be construed as a limit to this application.

What is claimed is:

1. A method, comprising:
obtaining a search term entered in a search bar; and
displaying an associated term and an identifier corresponding to the associated term, wherein the associated term corresponds to the search term, wherein an application corresponds to the associated term, wherein the identifier opens the application corresponding to the associated term, and wherein the identifier corresponding to the associated term comprises an application icon of the application corresponding to the associated term.

2. The method of claim 1, wherein a domain corresponding to the associated term is based on a correspondence between the domain and an object in the domain, wherein the application corresponding to the associated term is based on a correspondence between the domain and the application, and wherein the domain is one of a video domain, a music domain, a gaming domain, a reader domain, and the like.

3. The method of claim 2, wherein the correspondence between the domain and the object in the domain further comprises a popularity value in the domain.

4. The method of claim 2, wherein the correspondence between the domain and the application further comprises at least one of the application icon or a link associated with the application.

5. The method of claim 1, wherein the identifier corresponding to the associated term comprises a domain identifier corresponding to the associated term, wherein the domain identifier identifies a video domain, a music domain, a gaming domain, a reader domain, and the like, wherein the domain identifier opens a first menu, and wherein the first menu displays the application icon of the application corresponding to the associated term.

6. The method of claim 1, wherein the application is installed on a terminal device, and wherein the application icon directly opens a first application.

7. The method of claim 1, wherein the application corresponding to the associated term comprises a first application installed on a terminal device and a second application not installed on the terminal device, and wherein the application icon downloads the second application.

8. The method of claim 7, wherein the application icon directly opens the first application.

9. The method of claim 1, wherein before displaying the associated term and the identifier corresponding to the associated term, the method further comprises sorting the associated term.

10. The method of claim 9, wherein sorting the associated term comprises performing sorting based on a text length of the associated term.

11. The method of claim 9, wherein sorting the associated term comprises performing sorting based on a user preference value for a domain corresponding to at least one of the associated term or a popularity value in the domain and wherein the domain is one of a video domain, a music domain, a gaming domain, a reader domain, and the like.

12. The method or claim 1, wherein the search term corresponds to a preset quantity of associated terms.

13. The method or claim 1, wherein the associated term corresponds to the search term by matching, based on a user search record, a first associated term comprising the search term.

14. The method of claim 1, wherein the associated term corresponds to the search term by receiving, based on an association result returned by a server, the associated term corresponding to the search term.

15. A terminal device, comprising:
a memory configured to store instructions; and
one or more processors coupled to the memory and configured to execute the instructions to cause the terminal device to:
obtain a search term entered in a search bar; and
display an associated term and an identifier corresponding to the associated term, wherein the associated term corresponds to the search term, wherein an application corresponds to the associated term, wherein the identifier is used to open the application corresponding to the associated term, and wherein the identifier corresponding to the associated term comprises an application icon of the application corresponding to the associated term.

16. The terminal device of claim 15, wherein a domain corresponding to the associated term is based on a correspondence between the domain and an object in the domain, wherein the application corresponding to the associated term is based on a correspondence between the domain and the application, and wherein the domain is one of a video domain, a music domain, a gaming domain, a reader domain, and the like.

17. The terminal device of claim 15, wherein the identifier corresponding to the associated term comprises a domain identifier corresponding to the associated term, wherein the domain identifier identifies a video domain, a music domain, a gaming domain, a reader domain, and the like, wherein the domain identifier opens a first menu, and wherein the first menu displays the application icon of the application corresponding to the associated term.

18. The terminal device of claim 15, wherein the application is installed on the terminal device, and wherein the application icon directly opens a first application.

19. The terminal device of claim 15, wherein the application corresponding to the associated term comprises a first application installed on the terminal device and a second application not installed on the terminal device, and wherein the application icon downloads the second application.

20. A computer program product comprising instructions that are stored on a non-transitory computer-readable medium and that, when executed by one or more processors, cause a terminal device to:
obtain a search term entered in a search bar; and
display an associated term and an identifier corresponding to the associated term, wherein the associated term corresponds to the search term, wherein an application corresponds to the associated term, wherein the identifier is used to open the application corresponding to the associated term, and wherein the identifier corresponding to the associated term comprises an application icon of the application corresponding to the associated term.

* * * * *